United States Patent
HajiahmadiFoomani et al.

(10) Patent No.: US 12,459,264 B2
(45) Date of Patent: Nov. 4, 2025

(54) PRINTHEAD MAINTENANCE FOR RECOMMENDING PRINTHEAD REPLACEMENT

(71) Applicants: Farnaz HajiahmadiFoomani, Boulder, CO (US); Ziling Zhang, Boulder, CO (US); Scott R. Johnson, Erie, CO (US); William Edward Manchester, Erie, CO (US)

(72) Inventors: Farnaz HajiahmadiFoomani, Boulder, CO (US); Ziling Zhang, Boulder, CO (US); Scott R. Johnson, Erie, CO (US); William Edward Manchester, Erie, CO (US)

(73) Assignee: Ricoh Company, Ltd., Tokyo (JP)

( * ) Notice: Subject to any disclaimer, the term of this patent is extended or adjusted under 35 U.S.C. 154(b) by 244 days.

(21) Appl. No.: 18/116,932

(22) Filed: Mar. 3, 2023

(65) Prior Publication Data
US 2024/0294012 A1    Sep. 5, 2024

(51) Int. Cl.
  *B41J 2/165*   (2006.01)
  *B41J 2/045*   (2006.01)
  *G06N 3/08*    (2023.01)

(52) U.S. Cl.
  CPC ......... *B41J 2/16579* (2013.01); *B41J 2/0451* (2013.01); *G06N 3/08* (2013.01)

(58) Field of Classification Search
  None
  See application file for complete search history.

(56) References Cited

U.S. PATENT DOCUMENTS

| | | | |
|---|---|---|---|
| 7,287,824 B2 | 10/2007 | Subirada et al. | |
| 7,380,899 B2 | 6/2008 | Arakawa et al. | |

(Continued)

FOREIGN PATENT DOCUMENTS

| | | |
|---|---|---|
| DE | 102019208149 A1 | 1/2020 |
| JP | 004798233 B2 | 10/2011 |

(Continued)

OTHER PUBLICATIONS

Binding et al; Machine Learning Predictive Maintenance on Data in the Wild; 2009 IEEE.

(Continued)

*Primary Examiner* — Scott A Richmond
(74) *Attorney, Agent, or Firm* — Duft & Bornsen, PC

(57) ABSTRACT

Systems and methods of recommending replacement of printheads. In an embodiment, a system trains a first neural network to generate anomaly scores for printheads using an unsupervised learning algorithm based on first training samples of conforming printhead data from a pool of conforming printheads. The system generates a training dataset for a recurrent second neural network by identifying training printhead data for a pool of training printheads, inputting second training samples of the training printhead data into the first neural network to generate training anomaly scores for the training printheads over a plurality of time units, and formatting third training samples for the training printheads. The system trains the recurrent second neural network to generate scaled anomaly scores for printheads using a supervised learning algorithm based on the second training dataset.

20 Claims, 21 Drawing Sheets

(56) References Cited

U.S. PATENT DOCUMENTS

| | | |
|---|---|---|
| 7,726,760 B2 | 6/2010 | Ikefuji et al. |
| 8,807,684 B2 | 8/2014 | Allworth et al. |
| 8,814,316 B2 | 8/2014 | Kido |
| 8,870,322 B2 | 10/2014 | Martin et al. |
| 9,056,512 B1 | 6/2015 | Kanzaki |
| 9,539,803 B2 | 1/2017 | Michel et al. |
| 10,099,473 B2 | 10/2018 | Anderson et al. |
| 10,144,215 B2 | 12/2018 | Mihailovic et al. |
| 10,286,651 B2 | 5/2019 | Stefani et al. |
| 10,384,445 B2 | 8/2019 | Isal Cortes et al. |
| 10,391,785 B1 | 8/2019 | Trachanas et al. |
| 10,576,751 B2 | 3/2020 | Gazala |
| 10,596,806 B2 | 3/2020 | Neeb et al. |
| 10,603,900 B2 | 3/2020 | Fehlner et al. |
| 10,603,923 B2 | 3/2020 | Muehl et al. |
| 10,625,499 B2 | 4/2020 | Neeb et al. |
| 10,926,534 B2 | 2/2021 | Soleimanzadeh et al. |
| 10,953,662 B2 | 3/2021 | Muramatsu |
| 11,042,145 B2 | 6/2021 | Zhang et al. |
| 11,077,685 B2 | 8/2021 | Wu et al. |
| 11,084,280 B2 | 8/2021 | Nishikawa |
| 11,099,551 B2 | 8/2021 | Ristovski et al. |
| 11,292,269 B2 | 4/2022 | Trachanas et al. |
| 11,310,371 B2 | 4/2022 | Mizuta |
| 11,504,966 B2 | 11/2022 | Rodriguez-Llorente |
| 11,580,630 B2 | 2/2023 | Soltwedel et al. |
| 11,941,308 B2 | 3/2024 | Brock et al. |
| 2017/0368839 A1 | 12/2017 | Koehler et al. |
| 2020/0361210 A1* | 11/2020 | Sato ................ G06N 3/084 |
| 2021/0183036 A1 | 6/2021 | Gurudath et al. |
| 2021/0316549 A1 | 10/2021 | Lau |
| 2021/0397392 A1 | 12/2021 | Adachi et al. |
| 2022/0080736 A1 | 3/2022 | Suzuki |
| 2023/0077675 A1 | 3/2023 | Liu |
| 2023/0256734 A1 | 8/2023 | Jowkar et al. |
| 2023/0264483 A1 | 8/2023 | Levant et al. |
| 2024/0001608 A1 | 1/2024 | Michielsen et al. |
| 2024/0198666 A1* | 6/2024 | Nishikawa ........ B41J 2/04581 |

FOREIGN PATENT DOCUMENTS

| | | |
|---|---|---|
| JP | 004816820 B2 | 11/2011 |
| JP | 004901214 B2 | 3/2012 |
| JP | 005220474 B2 | 6/2013 |
| JP | 005227686 B2 | 7/2013 |
| JP | 2016141102 A | 8/2016 |
| JP | 006158726 B2 | 7/2017 |
| JP | 006278556 B | 2/2018 |
| JP | 2018030348 A | 3/2018 |
| JP | 006472083 B2 | 2/2019 |
| JP | 006494847 B1 | 4/2019 |
| JP | 006517194 B2 | 5/2019 |
| JP | 006576316 B2 | 9/2019 |
| JP | 006643512 B2 | 2/2020 |
| JP | 006711723 B2 | 6/2020 |
| JP | 006814883 B2 | 1/2021 |
| JP | 2021154683 A | 10/2021 |
| JP | 006988825 B2 | 1/2022 |
| JP | 2022049896 A | 3/2022 |
| JP | 007047386 B | 4/2022 |
| JP | 007143653 B2 | 9/2022 |
| JP | 2022131463 A | 9/2022 |
| JP | 2023031271 A | 3/2023 |
| JP | 2023076953 A | 6/2023 |
| JP | 007316299 B2 | 7/2023 |
| JP | 2023129792 A | 9/2023 |
| JP | 007372432 B2 | 10/2023 |
| JP | 007395907 B2 | 12/2023 |
| JP | 2024007340 A | 1/2024 |
| JP | 2024046488 A | 4/2024 |

OTHER PUBLICATIONS

Indyk et al; Machine Learning methods for Predictive Maintenance of Multifunctional Printers; San Diego, CA; Aug. 24, 2020.

Predictive Maintenance of Enterprise Printers; Toumetis; https://toumetis.com; Sep. 12, 2022.

* cited by examiner

PRINTHEAD MAINTENANCE FOR RECOMMENDING PRINTHEAD REPLACEMENT

TECHNICAL FIELD

The following disclosure relates to the field of image formation, and more particularly, to printhead failures.

BACKGROUND

Image formation is a procedure whereby a digital image is recreated by propelling droplets of ink or another type of print fluid onto a medium, such as paper, plastic, a substrate for 3D printing, etc. Image formation is commonly employed in apparatuses, such as printers (e.g., inkjet printer), facsimile machines, copying machines, plotting machines, multifunction peripherals, etc. The core of a typical jetting apparatus or image forming apparatus is one or more liquid-droplet ejection heads (referred to generally herein as "printheads") having nozzles that discharge liquid droplets, a mechanism for moving the printhead and/or the medium in relation to one another, and a controller that controls how liquid is discharged from the individual nozzles of the printhead onto the medium in the form of pixels.

One type of jetting apparatus is a commercial or industrial printing apparatus, such as a continuous feed printer, a cutsheet printer, a wide format printer, etc. A continuous feed printer performs high-volume inkjet printing on a web of print media stored on a large roll. A cutsheet printer performs inkjet printing on individual sheets of print media. A wide format printer performs inkjet printing on a large web or large sheets of print media. A printing apparatus such as this, along with other types of printers, implements one or more printheads configured to jet droplets of ink or another type of print fluid onto print media. Over time, printheads may eventually reach a point of poor health. For example, one or more nozzles of a printhead may become clogged or partially clogged with congealed ink, contaminants, etc., resulting in jet-out defects, deviated-jet defects, etc. Also, one or more printheads may encounter a structural failure (e.g., delamination, damage to nozzle plate, etc.) where a grouping of adjacent nozzles fails to jet properly. These and other defects in printheads result in degraded print quality.

SUMMARY

Embodiments described herein provide for printhead maintenance. A printing system may include one or more jetting apparatuses (e.g., printers) each comprising multiple printheads. A printhead maintenance supervisor as described herein monitors the performance of the printheads, and recommends whether to replace certain printheads. The recommendation provided by the printhead maintenance supervisor is based on machine learning to improve the accuracy of the recommendation. One technical benefit is printheads are less likely to be replaced before needed, and printheads that require replacement are accurately identified.

In an embodiment, a printhead maintenance supervisor comprises at least one processor and memory. The processor is configured to cause the printhead maintenance supervisor at least to train a first neural network to generate anomaly scores for printheads using an unsupervised learning algorithm based on first training samples of conforming printhead data from a pool of conforming printheads. The processor is configured to further cause the printhead maintenance supervisor at least to generate a training dataset for a recurrent second neural network by identifying training printhead data for a pool of training printheads, inputting second training samples of the training printhead data into the first neural network to generate training anomaly scores for the training printheads over a plurality of time units, and formatting third training samples for the training printheads, where each of the third training samples comprises a time-series of training data objects over a number of consecutive time units for a training printhead, and a label for the training printhead, and where each of the training data objects includes a training anomaly score generated by the first neural network for the training printhead, and at least a subset of the training printhead data for the training printhead. The processor is configured to cause the printhead maintenance supervisor at least to train the recurrent second neural network to generate scaled anomaly scores for printheads using a supervised learning algorithm based on the training dataset.

In an embodiment, a printhead maintenance supervisor comprises at least one processor and memory. The processor is configured to cause the printhead maintenance supervisor at least to identify deployed printhead data for a plurality of deployed printheads, operate the first neural network trained to generate deployment anomaly scores for the deployed printheads, operate the recurrent second neural network trained to scale the deployment anomaly scores generated by the first neural network to produce scaled anomaly scores for the deployed printheads, and provide a replacement recommendation for one or more of the deployed printheads based on the scaled anomaly scores for the deployed printheads.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
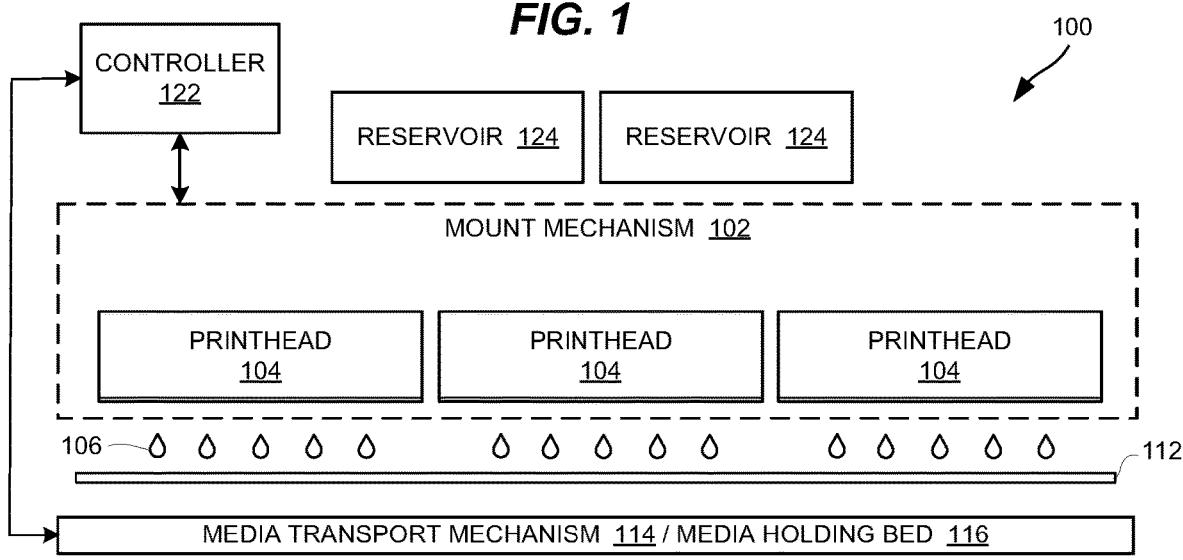
FIG. 1 is a schematic diagram of a jetting apparatus.

FIG. 1 is a schematic diagram of a jetting apparatus 100. A jetting apparatus 100 is a device or system that uses one or more printheads 104 to eject a print fluid or marking material onto a medium. One example of jetting apparatus 100 is an inkjet printer (e.g., continuous feed or cutsheet printer) that performs single-pass printing. Other examples of jetting apparatus 100 include a scan pass inkjet printer (e.g., a wide format printer), a multifunction printer, a desktop printer, an industrial printer, a 3D printer, etc. Generally, jetting apparatus 100 includes a mount mechanism 102 that supports one or more printheads 104 in relation to a medium 112. Mount mechanism 102 may be fixed within jetting apparatus 100 for single-pass printing. Alternatively, mount mechanism 102 may be disposed on a carriage assembly that reciprocates back and forth along a scan line or sub-scan direction for multi-pass printing. Printheads 104 are a device, apparatus, or component configured to eject droplets 106 of a print fluid, such as ink (e.g., water, solvent, oil, or UV-curable), through a plurality of nozzles (not visible in FIG. 1). The droplets 106 ejected from the nozzles of printheads 104 are directed toward medium 112. Medium 112 comprises any type of material upon which ink or another print or jetting fluid is applied by a printhead, such as paper, plastic, card stock, transparent sheets, a substrate for 3D printing, cloth, etc. Typically, nozzles of printheads 104 are arranged in one or more rows so that ejection of a print fluid from the nozzles causes formation of characters, symbols, images, layers of an object, etc., on medium 112 as printhead 104 and/or medium 112 are moved relative to one another. Jetting apparatus 100 may include a media transport mechanism 114 or a media holding bed 116. Media transport mechanism 114 is configured to move medium 112 relative to printheads 104. Media holding bed 116 (e.g., a platen) is configured to support medium 112 in a stationary position while the printheads 104 move in relation to medium 112.

Jetting apparatus 100 also includes a jetting apparatus controller 122 that controls the overall operation of jetting apparatus 100. Jetting apparatus controller 122 may connect to a data source to receive a print job, print data, image data, or the like, and control each printhead 104 to discharge the print fluid on medium 112. Jetting apparatus 100 also includes one or more reservoirs 124 for a print fluid or multiple types of print fluid. Although not shown in FIG. 1, reservoirs 124 are fluidly coupled to printheads 104, such as with hoses, tubes, or the like.

Figure 2:
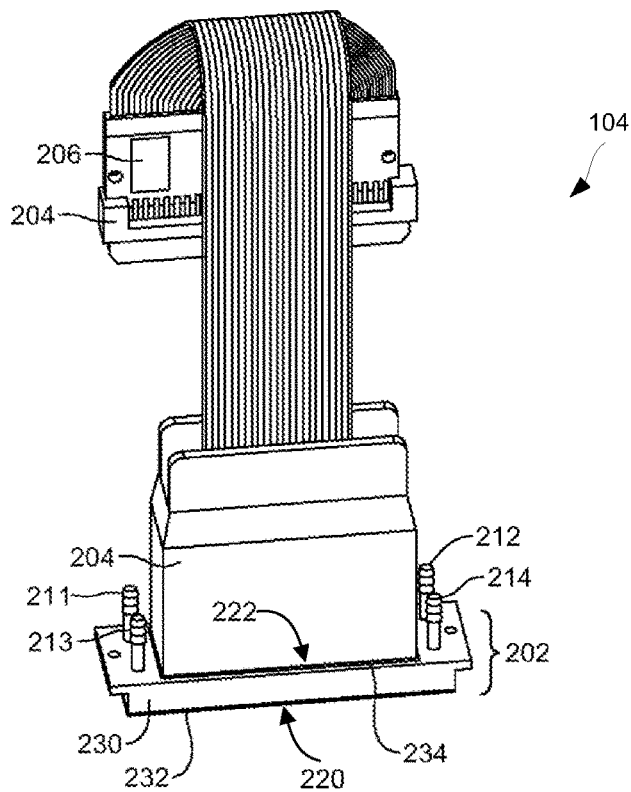
FIG. 2 is a perspective view of a printhead.

FIG. 2 is a perspective view of a printhead 104. In this embodiment, printhead 104 includes a head member 202 and electronics 204. Head member 202 is an elongated component that forms the jetting channels of printhead 104. A typical jetting channel includes a nozzle, a pressure chamber, and a diaphragm that is driven by an actuator, such as a piezoelectric actuator. Electronics 204 control how the nozzles of printhead 104 jet droplets in response to data signals and control signals received from another controller (e.g., jetting apparatus controller 122). Electronics 204 include an embedded printhead controller 206 or driver circuits configured to drive individual jetting channels based on the data signals and control signals. The bottom surface of head member 202 in FIG. 2 includes the nozzles of the jetting channels, and represents the discharge surface 220 of printhead 104. The top surface of head member 202 in FIG. 2 (referred to as I/O surface 222) represents the Input/Output (I/O) portion for receiving one or more print fluids into printhead 104, and/or conveying print fluids (e.g., fluids that are not jetted) out of printhead 104. I/O surface 222 includes a plurality of I/O ports 211-214. An I/O port 211-214 may comprise an inlet I/O port, which is an opening in head member 202 that acts as an inlet or entry point for a print fluid. An I/O port 211-214 may comprise an outlet I/O port, which is an opening in head member 202 that acts as an outlet or exit point for a print fluid. I/O ports 211-214 may include a hose coupling, hose barb, etc., for coupling with a hose of a reservoir, a cartridge, or the like. The number of I/O ports 211-214 is provided as an example, as printhead 104 may include other numbers of I/O ports.

In general, head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with (i.e., come into contact with) diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack. Plate stack 232 may include the following plates: one or more nozzle plates, one or more chamber plates, one or more restrictor plates, a spacer (or support) plate, and a diaphragm plate. A nozzle plate includes a plurality of nozzles that are arranged in one or more rows. A chamber plate includes a plurality of openings that form the pressure chambers of the jetting channels. A restrictor plate includes a plurality of openings that form restrictors to fluidly couple the pressure chambers of the jetting channels with a manifold. A diaphragm plate is a sheet of a semi-flexible material that vibrates in response to actuation by an actuator (e.g., piezoelectric actuator).

FIG. 2 illustrates one particular configuration of a printhead 104, and it is understood that other printhead configurations are considered herein that have a plurality of jetting channels.

Figure 3:
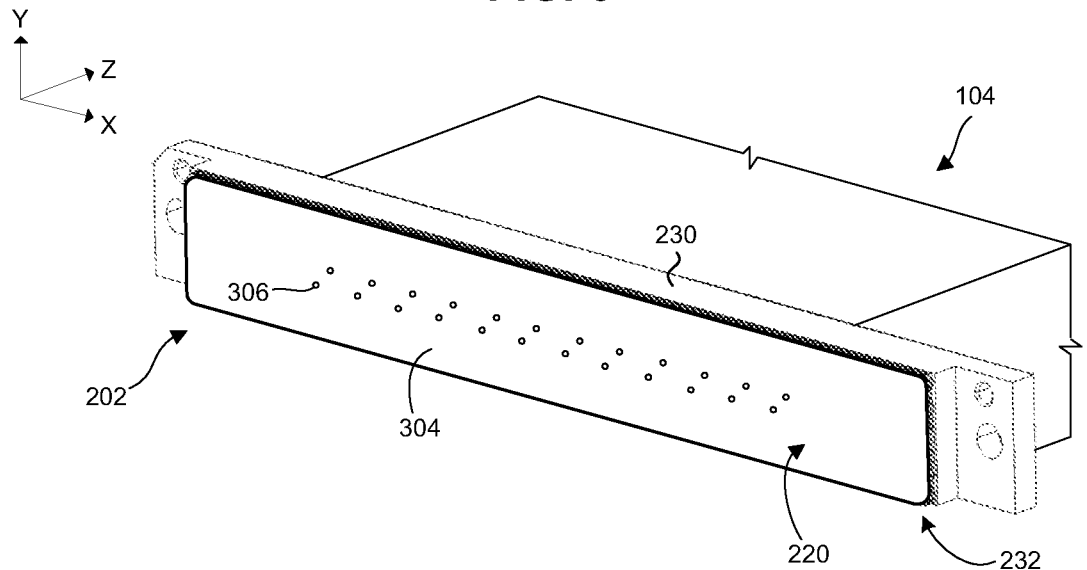
FIG. 3 is a perspective view of a printhead.

FIG. 3 is a perspective view of a printhead 104. In general, head member 202 is an assembly that includes housing 230, and plate stack 232 affixed or attached to housing 230. Plate stack 232 is an elongated stack having a length (i.e., along the x-axis) and a width (i.e., along the y-axis). Plate stack 232 includes one or more nozzle plates 304 having orifices that form nozzles 306 of the jetting channels. Thus, the bottom surface of nozzle plate 304 defines the discharge surface 220 of printhead 104. Nozzles 306 are shown in two nozzle rows in FIG. 3 disposed longitudinally along the length of plate stack 232. Although two rows of nozzles 306 are illustrated in FIG. 3, the jetting channels and their corresponding nozzles 306 may be arranged in a single row or more than two rows in other examples.

In a jetting apparatus 100, such as illustrated in FIG. 1, printheads 104 may eventually reach a point of poor health over time resulting in jetting defects. For example, one or more nozzles 306 of a printhead 104 may become clogged or partially clogged, a printhead 104 may encounter a structural failure where a grouping of adjacent nozzles fail to jet properly, etc. In some instances, a printhead 104 may recover from jetting defects with cleaning or other maintenance operations, while in other instances, the printhead 104 needs to be replaced. Due to replacement costs, it is desirable to avoid replacement of printheads 104 experiencing jetting defects that are recoverable. Described herein is a printhead maintenance supervisor configured to monitor the performance of printheads 104, and to recommend whether to replace certain printheads 104.

Figure 4:
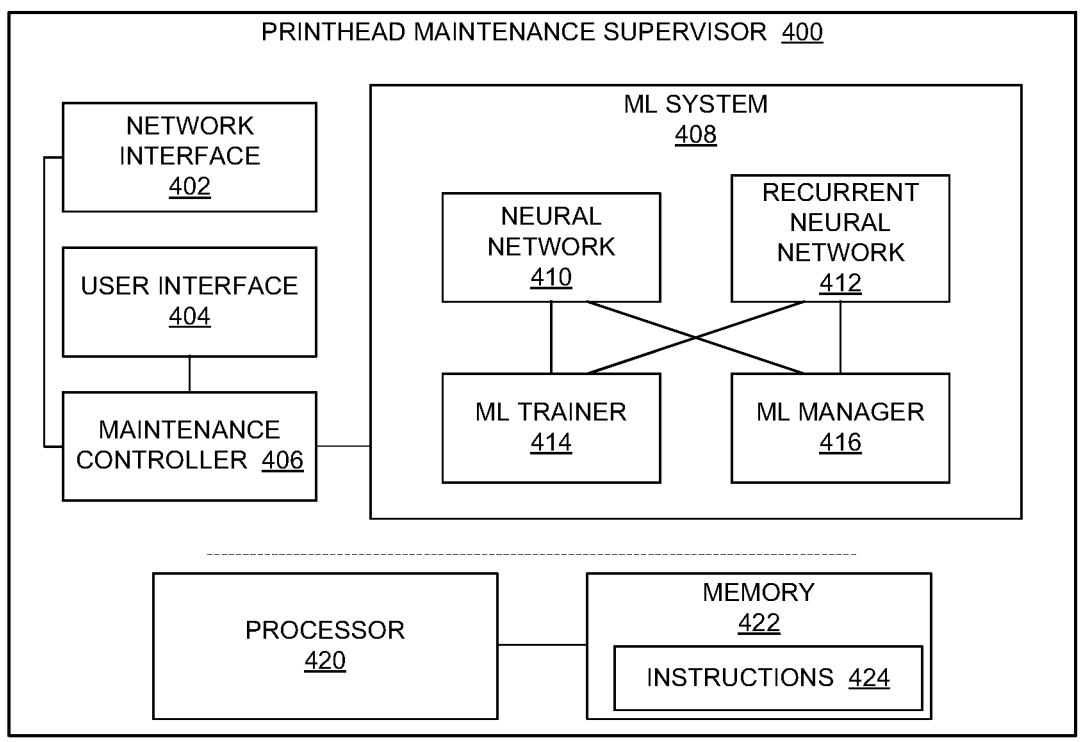
FIG. 4 is a block diagram of a printhead maintenance supervisor in an illustrative embodiment.

FIG. 4 is a block diagram of a printhead maintenance supervisor 400 in an illustrative embodiment. Printhead maintenance supervisor 400 is a server, device, apparatus, equipment (including hardware), means, etc., configured to recommend replacement of one or more printheads 104 of an image forming apparatus, a jetting apparatus, a printing apparatus, etc. Although printhead maintenance supervisor 400 is described with reference to one or more printers, the concepts disclosed below apply to other types of image forming apparatuses.

In this embodiment, printhead maintenance supervisor 400 includes the following subsystems: a network interface component 402, a user interface component 404, a maintenance controller 406, and a machine learning (ML) system 408. Network interface component 402 is a hardware component or circuitry that communicates with external devices, systems, or entities. For example, network interface component 402 may receive data or files regarding a printer and/or one or more printheads of a printer, such as a schedule or number of printhead cleanings, print speed, print resolution, temperature, voltage adjustment, uniformity, nozzle defect information (e.g., number of nozzles with jet-out defects, deviated-jet defects, nozzle failure, etc.). Network interface component 402 may receive the data over a wide area network connection (e.g., via the internet), such as via a messaging protocol, email, a file transfer protocol, an Application Programming Interface (API), etc. Network interface component 402 may receive the data over a local area network connection, a local bus, etc.

User interface component 404 may comprise circuitry, logic, hardware, means, etc., configured to interact with an end user. For example, user interface component 404 may include a display, screen, touch screen, or the like (e.g., a Liquid Crystal Display (LCD), a Light Emitting Diode (LED) display, etc.). User interface component 404 may include a keyboard or keypad, a tracking device (e.g., a trackball or trackpad), a speaker, a microphone, etc. User interface component 404 may provide a Graphical User Interface (GUI), portal, etc., configured to display information to an end user, such as through a display. User interface component 404 may also receive input, commands, etc., from an end user.

Maintenance controller 406 may comprise circuitry, logic, hardware, means, etc., configured to perform one or more actions or tasks to provide recommendations for replacement of printheads 104. For example, maintenance controller 406 may collect data or files from one or more sources associated with printing operations and/or printheads. Maintenance controller 406 may collect the data periodically, and store the data identifiable per printhead 104 based on policies or rules. Data collected by maintenance controller 406 may be stored in Apache Parquet files or in another format. Maintenance controller 406 may also manage operations (e.g., with ML system 408) to determine whether replacement is recommended for printheads 104.

ML system 408 may comprise circuitry, logic, hardware, means, etc., configured to use machine learning techniques to perform functions, such as determine or estimate the health of a printhead, a partial or total failure of a printhead, and/or other functions. In this embodiment, two ML models are illustrated for ML system 408: neural network 410, and recurrent neural network 412. In general, neural network 410 (also referred to as a first neural network) learns from training samples of printhead data from healthy printheads, and is trained to generate anomaly scores for printheads. Recurrent neural network 412 (also referred to as a recurrent second neural network) learns from training samples that include anomaly scores, printhead data, and a corresponding label, and is trained to scale the anomaly scores to generate scaled anomaly scores. ML system 408 further includes an ML trainer 414 and an ML manager 416. ML trainer 414 is configured to build or train neural networks by feeding training data to the neural networks. ML trainer 414 may comprise circuitry, logic, hardware, means, etc., configured to train or re-train one or more neural networks or other ML models. ML trainer 414 may build or train other models not shown in FIG. 4. ML manager 416 may comprise circuitry, logic, hardware, means, etc., configured to manage one or more neural networks. For example, ML manager 416 is configured to input data into neural networks during testing or after deployment, and receive output from the neural networks, along with other functions.

One or more of the subsystems of printhead maintenance supervisor 400 may be implemented on a hardware platform comprised of analog and/or digital circuitry. One or more of the subsystems of printhead maintenance supervisor 400 may be implemented on one or more processors 420 that execute instructions 424 (i.e., computer program code) stored in memory 422. Processor 420 comprises an integrated hardware circuit configured to execute instructions 424, and memory 422 is a computer readable storage medium for data, instructions 424, applications, etc., and is accessible by processor 420. Printhead maintenance supervisor 400 may include additional components that are not shown for the sake of brevity.

The following description provides an example of recommending replacement of printheads 104 within one or more printers. Although printers are discussed, similar systems and procedures may be used to recommend replacement of printheads 104 in other types of image forming apparatuses.

Figure 5:
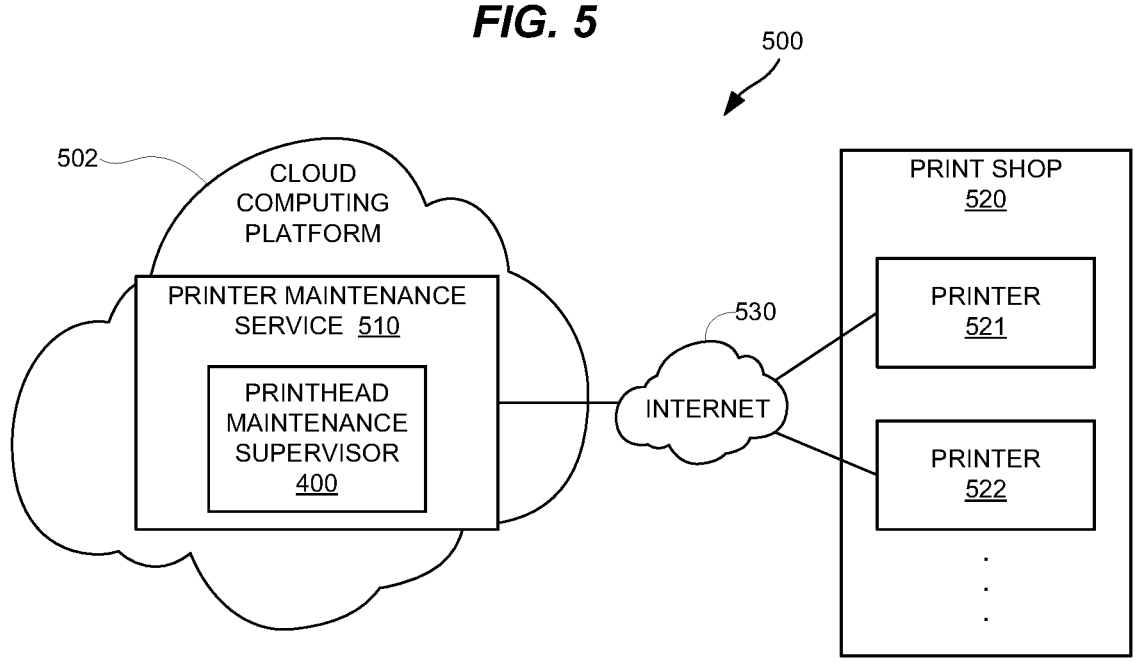
FIG. 5 illustrates a printing system associated with a cloud computing platform in an illustrative embodiment.

FIG. 5 illustrates a printing system 500 associated with a cloud computing platform 502 in an illustrative embodiment. In this embodiment, printing system 500 includes a plurality of printers 521-522, such as a production printer (e.g., continuous feed printer), desktop printer, 3D printer, plotter or wide-format printer, etc. Printers 521-522 are illustrated in a print shop 520 of a Print Service Providers (PSP) or the like that provides printing services to users/customers in exchange for monetary compensation. In an embodiment, print shop 520 may be configured to provide commercial and/or industrial printing services, which are referred to herein as production printing services. However, print shop 520 may be configured to provide other types of services in other embodiments.

Printing system 500 uses or subscribes to a printer maintenance service 510 implemented on cloud computing platform 502. Some examples of cloud computing platform 502 may comprise Amazon Web Services (AWS), Google Cloud, Microsoft Azure, etc. Printers 521-522 are able to communicate (directly or indirectly) with the printer maintenance service 510 over the internet 530 or another type of communication network (e.g., enterprise network). The internet 530 as referred to herein is a system of interconnected computer networks that uses the Internet protocol suite (e.g., TCP/IP) to communicate between networks and devices, although other protocols may be developed in the future. In this embodiment, printhead maintenance supervisor 400 may be implemented as part of printer maintenance service 510 on cloud computing platform 502.

Figure 6:
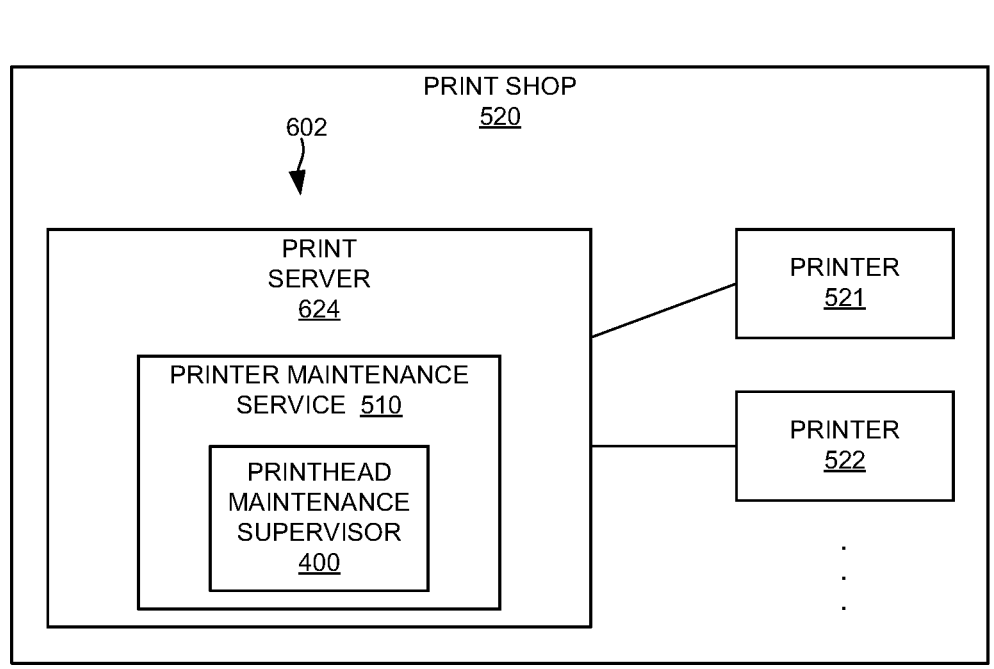
FIG. 6 illustrates a printing system associated with a hardware platform in an illustrative embodiment.

FIG. 6 illustrates a printing system 600 associated with a hardware platform 602 in an illustrative embodiment. As above, printing system 600 includes a plurality of printers 521-522 illustrated in a print shop 520. Printing system 600 also includes a print server 624 that is configured to manage or supervise printers 521-522. Print server 624 may include a Digital Front End (DFE) configured to receive print jobs from a client, generate printer-compliant data streams for the print jobs, and transmit the data streams to one or more of printers 521-522. Print server 624 may communicate with printers 521-522 via a wired connection (e.g., Ethernet) or a wireless connection. In an embodiment, printing system 600 uses or subscribes to a printer maintenance service 510 implemented on hardware platform 602. Printhead maintenance supervisor 400 may be implemented as part of printer maintenance service 510 on print server 624. However, printhead maintenance supervisor 400 may be implemented on an individual printer 521-522, or on an external system in other embodiments.

In an embodiment, printhead maintenance supervisor 400 may be implemented on a combination of a hardware platform 602 (e.g., print server 624) and a cloud computing platform 502.

Figure 7A:
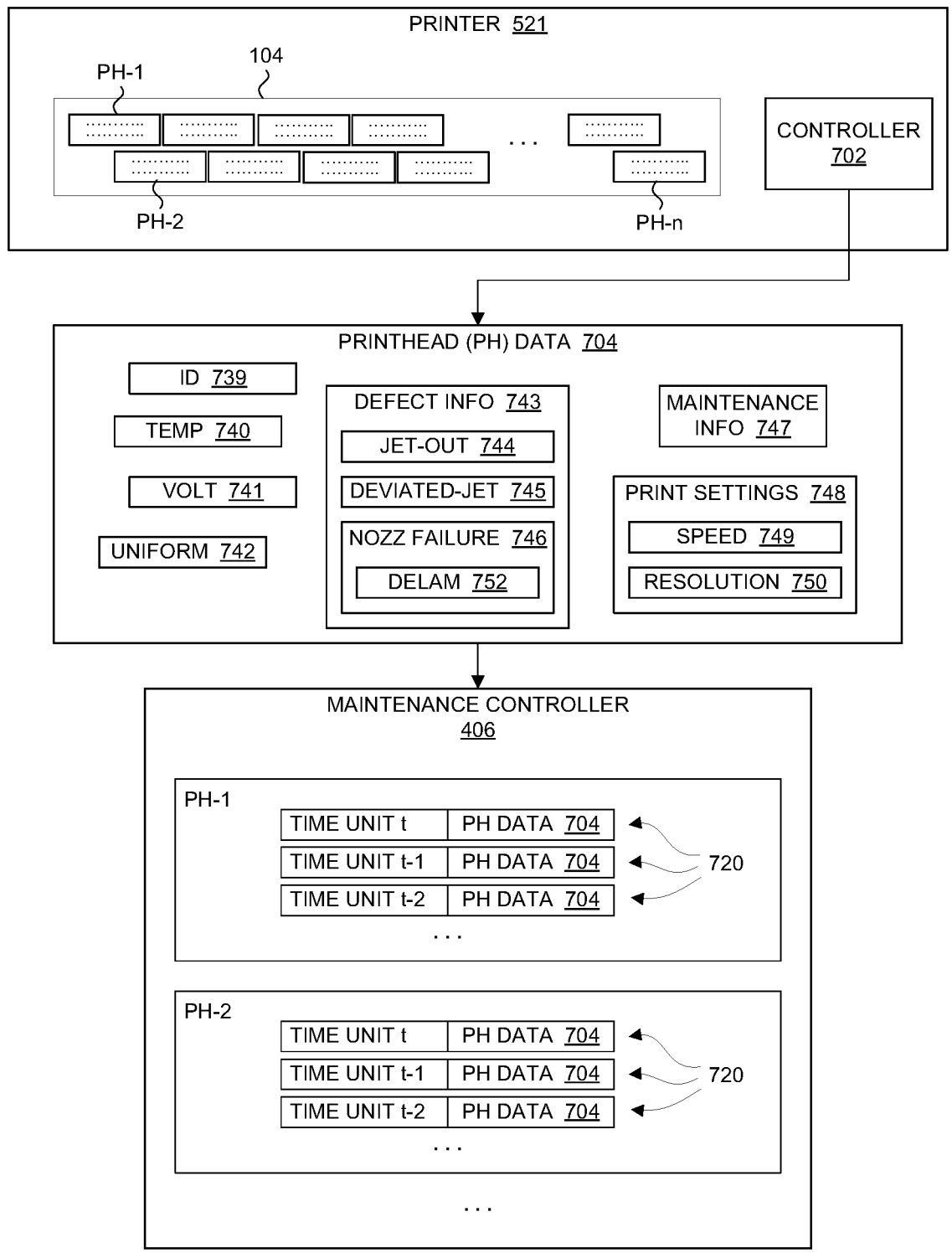
FIG. 7A is a block diagram of a printer and associated printhead data in an illustrative embodiment.

As part of a printer maintenance service 510, for example, printhead maintenance supervisor 400 may monitor one or more printers, such as printer 521. FIG. 7A is a block diagram of a printer 521 and associated printhead data 704 in an illustrative embodiment. Printer 521 includes one or more print engines that comprise a plurality of printheads 104 (e.g., PH-1, PH-2, . . . , PH-n). In an embodiment, printheads 104 may be individually replaceable within printer 521. However, multiple printheads 104 may be replaceable as a group or assembly within printer 521 in other embodiments. Printer 521 also includes a print controller 702. Print controller 702 is configured to control or manage print settings within printer 521, monitor operations within printer 521 (e.g., printer operations, cleaning operations, maintenance operations, etc.), collect and/or report printhead data 704 for printheads 104, etc. For example, controller 702 may be configured to collect and report printhead data 704 to printhead maintenance supervisor 400. Printhead data 704, as described herein, comprises any data corresponding with a printhead and/or print settings associated with the printhead. In an embodiment, the printhead data 704 may include data elements, such as a printhead identifier 739, temperature 740, voltage adjustment 741, uniformity 742, and defect information 743 for nozzles 306 (e.g., jet-out 744, deviated-jet 745, nozzle failure 746, etc.). The printhead identifier 739 (e.g., serial number, identification label, logical location, physical location, etc.) is data that identifies a particular printhead 104 from among the plurality of printheads 104 in the printer 521 and may be used to guide service personnel to the particular printhead 104. The printhead data 704 may include maintenance information 747, such as number of printhead cleanings, time since last cleaning, replacement time/date, time since the last replacement, etc. The printhead data 704 may include print settings 748, such as print speed 749 (e.g., pages per minute (ppm)), print resolution 750 (e.g., dots per inch (dpi)), and/or other settings. This is a non-exhaustive list and other printhead data 704 may be included. Printhead data 704 may be collected for each printhead 104 individually. Thus, some of the printhead data 704 corresponds with an individual printhead 104, such as defect information 743, while other printhead data 704 may correspond with a group of printheads 104, such as print speed 749 and print resolution 750.

The printhead data 704 may originate from a variety of sources. For example, printer 521 may print test charts with the printheads 104 (e.g., periodically), and scan or image the printed test charts. The images of the test charts may then be analyzed to detect defect information 743 for nozzles 306 of the printheads 104, such as jet-out defects 744, deviated-jet defects 745, and nozzle failures 746. A jet-out defect 744 of a nozzle 306 may be caused by a complete blocking of the nozzle 306, and may be detected when no print fluid is jetted at an expected location on the printed test chart. A deviated-jet defect 745 of a nozzle 306 may be caused by a partial blocking of the nozzle 306, and may be detected when print fluid is jetted at an unintended location on the printed test chart. A nozzle failure defect 746 of a nozzle 306 is a structural failure of the nozzle 306. Whereas some types of defects may be recoverable with cleaning operations or the like (e.g., jet-out defects 744 and deviated-jet defects 745), a structural failure is not recoverable. One type of nozzle failure defect 746 is a delamination defect 752, where debonding occurs between the nozzle plate 304 and/or other plates of the laminated plate stack 232 (see FIGS. 2-3). Other types of nozzle failure defects 746 may include abrasion from cleaning operations, corrosion, damage due to unintended contact with the nozzle plate 304, etc. A nozzle failure defect 746 may be detected based on a defect pattern across multiple nozzles 306 that are physically adjacent to each other on printhead 104 and are identified based on an image of the printed test chart and the printer design which determines which nozzles correspond to the different portions of the printed test chart. Printhead maintenance supervisor 400 may implement a defect detection system that analyzes test charts as disclosed above to determine defect information for each of the nozzles 306 of printheads 104, such as with an ML system. However, a defect detection system may be implemented at printer 521 or another external system.

Maintenance controller 406 (see FIG. 4) may collect the printhead data 704 from printer 521, and maintain data logs 720 for the printheads 104. For example, maintenance controller 406 may query or poll controller 702 periodically to collect the printhead data 704, or the printhead data 704 may be pushed to maintenance controller 406. Maintenance controller 406 may store the printhead data 704 (or a subset of the printhead data 704) in the data logs 720 for the printheads 104. A data log 720 is a file or set of files, a record, a data storage object, etc., for data or information corresponding with a printhead 104. As illustrated in FIG. 7A, data logs 720 are created and maintained for a first printhead 104 (e.g., PH-1) and a second printhead 104 (e.g., PH-2). Data logs 720 include printhead data 704 per printhead 104. Each data log 720 is associated with a time unit (e.g., t, t-1, t-2, etc.), which is an interval of time, such as a day. For example, printhead data 704 may be pushed to maintenance controller 406 periodically during each time unit (e.g., daily), maintenance controller 406 may request or pull the printhead data 704 during each time unit, etc. Each data log 720 therefore stores a snapshot or copy of printhead data 704 for a printhead 104 at a time unit. If the time unit is a day, for example, a data log 720 may be referred to as a daily data log. Printhead maintenance supervisor 400 may collect printhead data 704 for printheads 104 of other printers in a similar manner as part of a printer maintenance service 510.

Figure 7B:
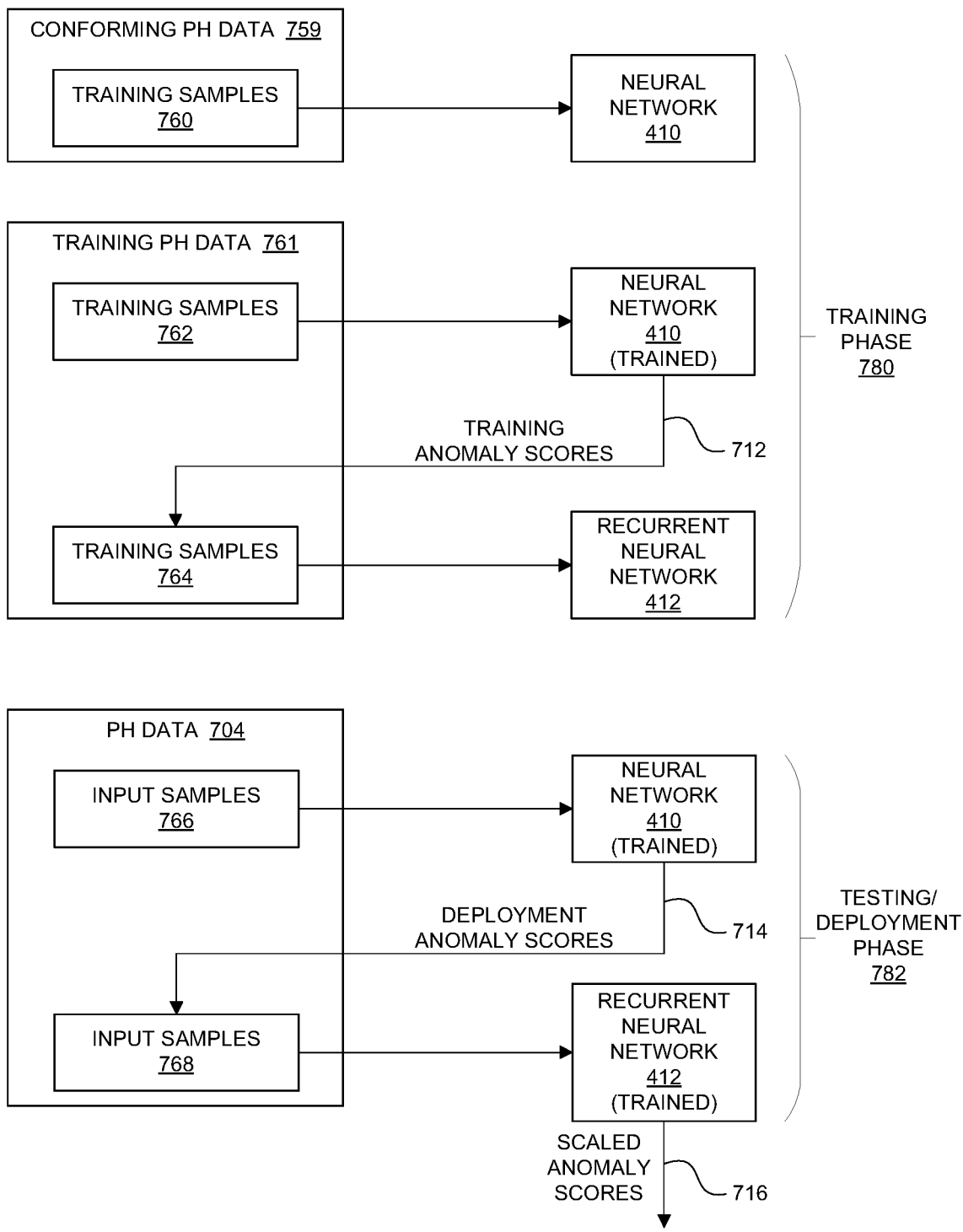
FIG. 7B is a schematic diagram of functional operations of a printhead maintenance supervisor in an illustrative embodiment.

FIG. 7B is a schematic diagram of functional operations of printhead maintenance supervisor 400 in an illustrative embodiment. Printhead maintenance supervisor 400 operates in a training phase 780, and a testing or deployment phase 782. In the training phase 780, ML trainer 414 operates to train neural network 410 and recurrent neural network 412. In the testing/deployment phase 782, ML manager 416 uses the trained neural network 410 and the trained recurrent neural network 412 to recommend replacement of printheads 104 of a deployed printer, such as printer 521. In the training phase 780, ML trainer 414 trains neural network 410 using training samples 760 (i.e., first training samples) of conforming printhead data 759 for healthy (i.e., conforming) printheads. With neural network 410 trained, ML trainer 414 uses neural network 410 to generate training data for recurrent neural network 412. Thus, ML trainer 414 inputs training samples 762 (i.e., second training samples) of training printhead data 761 for a pool of training printheads into neural network 410 to generate training anomaly scores 712 for the training printheads. ML trainer 414 then formats training samples 764 (i.e., third training samples) for recurrent neural network 412 based on the training anomaly scores 712 generated by neural network 410, and trains recurrent neural network 412 using training samples 764. One technical benefit is recurrent neural network 412 is trained to scale anomaly scores output by neural network 410 efficiently.

In the testing/deployment phase 782, ML manager 416 operates or implements neural network 410 to generate deployment anomaly scores 714 for deployed printheads 104, and operates or implements recurrent neural network 412 to scale the deployment anomaly scores 714 generated by neural network 410. For example, ML manager 416 inputs or enters input samples 766 (i.e., first input samples) of deployment printhead data 704 for printheads 104 (i.e., deployed printheads) into neural network 410 to generate deployment anomaly scores 714 for printheads 104. One technical benefit of generating deployment anomaly scores 714 is that the magnitude of a deployment anomaly score 714 output by neural network 410 may be used to indicate a failure condition in an individual printhead. However, the ranges of anomaly scores may vary per printhead 104. For example, the range of anomaly scores for one printhead 104 may be "0-500", while the range of anomaly scores for another printhead 104 may be "0-2000". Thus, it is difficult to identify a threshold score indicative of a failure condition. Printhead maintenance supervisor 400 is configured to scale the anomaly scores nonlinearly via recurrent neural network 412 to determine whether to recommend replacement of certain printheads 104. One technical benefit of scaling is that scaled anomaly scores from different printheads 104 may be readily compared to each other or to a common threshold. ML manager 416 formats input samples 768 (i.e., second input samples) for recurrent neural network 412 based on the deployment anomaly scores 714 generated by neural network 410 for the printheads 104. ML manager 416 then inputs or enters the input samples 768 into recurrent neural network 412 to generate scaled anomaly scores 716 for printheads 104. One technical benefit is that the scaled anomaly scores 716 may be used to recommend replacement for certain printheads 104. A further operation of printhead maintenance supervisor 400 is described below.

Training Phase

Figure 8:
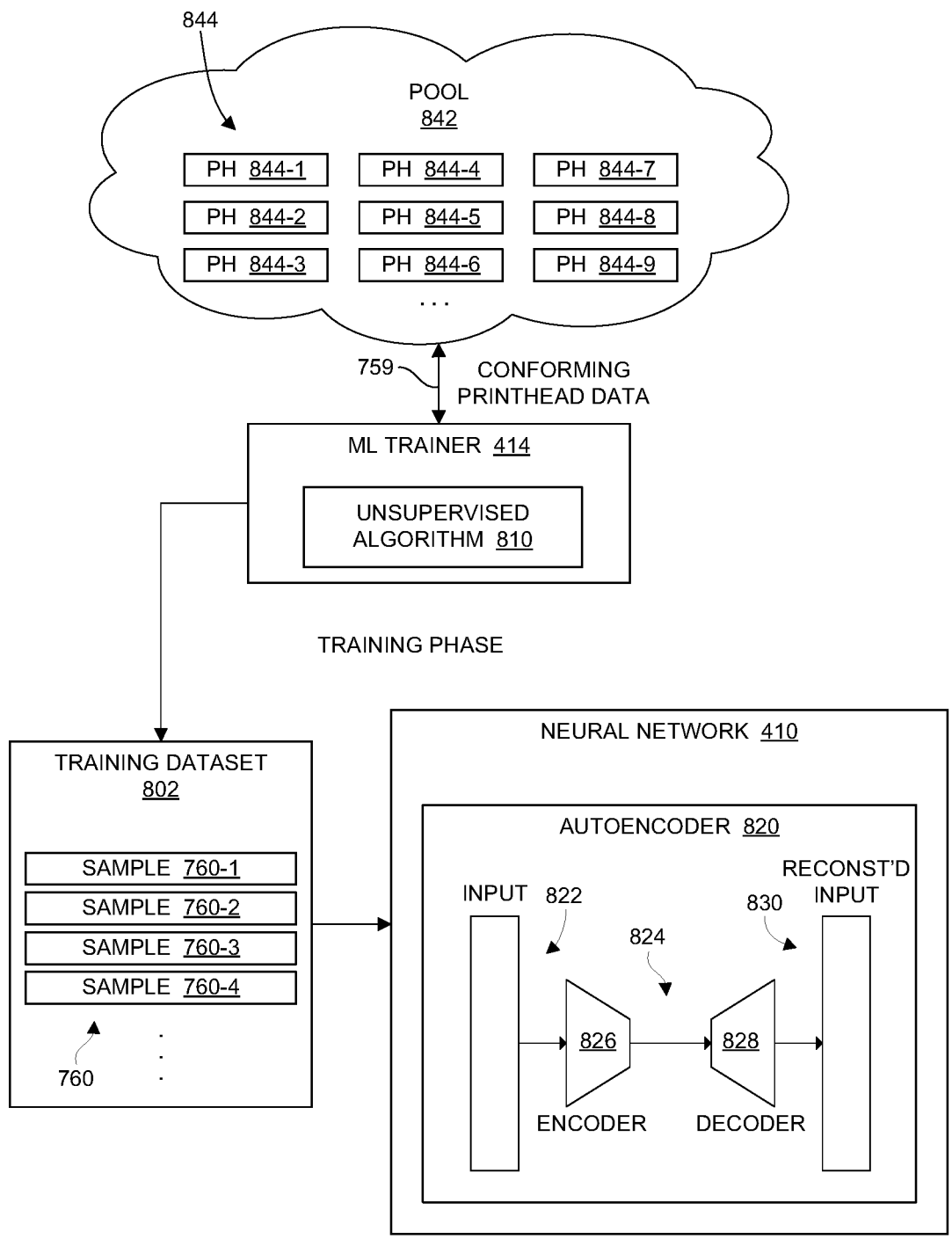
FIG. 8 illustrates training of a neural network in an illustrative embodiment.

The following illustrates the training phase 780 of neural network 410 and recurrent neural network 412 in an illustrative embodiment. FIG. 8 illustrates training of neural network 410 in an illustrative embodiment. During the training phase 780, ML trainer 414 trains neural network 410 using an unsupervised learning algorithm 810 based on a training dataset 802. Training with an unsupervised learning algorithm 810 uses data for conforming printheads. Thus, the training dataset 802 includes training samples 760 of conforming printhead data 759 (e.g., sample 760-1, 760-2, . . . ) regarding healthy (i.e., conforming) printheads (i.e., the target class) so that neural network 410 learns the distribution of data points for conforming printheads. Preferably, the training samples 760 of conforming printhead data 759 correspond exclusively to conforming printheads and not non-conforming printheads as this yields technical benefits such as allowing the training samples 760 to be readily available and definitive (i.e., brand new printheads are readily available and clearly are conforming printheads) and that conforming printheads directly support the training strategy where the neural network 410 reconstructs conforming printhead data to small errors. For example, ML trainer 414 has access to conforming printhead data 759 for a group or pool 842 of conforming printheads 844 (e.g., 844-1, 844-2, . . . , 844-9). A conforming printhead 844 is a printhead that is operating or is assumed to be operating correctly or acceptably. In an embodiment, a conforming printhead 844 may be a printhead that has been recently replaced. For example, a printhead replaced within a predetermined timeframe of six months, one year, two years, etc., may be considered a conforming printhead 844 for the purpose of creating the training dataset 802. Conforming printheads 844 in pool 842 may comprise printheads of a particular printer (e.g., indicated by serial number), a particular type of printhead or a particular type of printer (e.g., indicated by model number, manufacturer, etc.), printheads of a printer(s) operated by a particular customer, print shop, etc., or some other collection of printheads that are desired for training neural network 410. ML trainer 414 formats each training sample 760 of training dataset 802 to include conforming printhead data 759, or a desired subset of conforming printhead data 759, for a conforming printhead 844. For example, the training samples 760 of training dataset 802 have a structure or format comprising a set of data elements of the conforming printhead data 759 as desired, such as temperature 740, voltage adjustment 741, uniformity 742, defect information 743, maintenance information 747, print settings 748, etc.

In an embodiment, neural network 410 may comprise an autoencoder 820. As illustrated in FIG. 8, autoencoder 820 may comprise an input layer 822, one or more hidden layers 824 that comprise an encoder 826 and a decoder 828, and an output layer 830. Encoder 826 receives high-dimensional input data, and translates the input data into latent low-dimensional data. Decoder 828 receives the latent low-dimensional data from encoder 826, and reconstructs the input data as reconstructed input at output layer 830. One technical benefit of using an autoencoder 820 is reduction in the size of the input data. Although an autoencoder 820 is indicated in FIG. 8, other types of neural networks may be considered for neural network 410.

When neural network 410 is trained and a distribution of data points is learned for conforming printheads 844 based on training dataset 802, neural network 410 may be used to output an anomaly score for individual printheads. The anomaly scores output by neural network 410 may be used to train recurrent neural network 412 in the training phase 780.

Figure 9A:
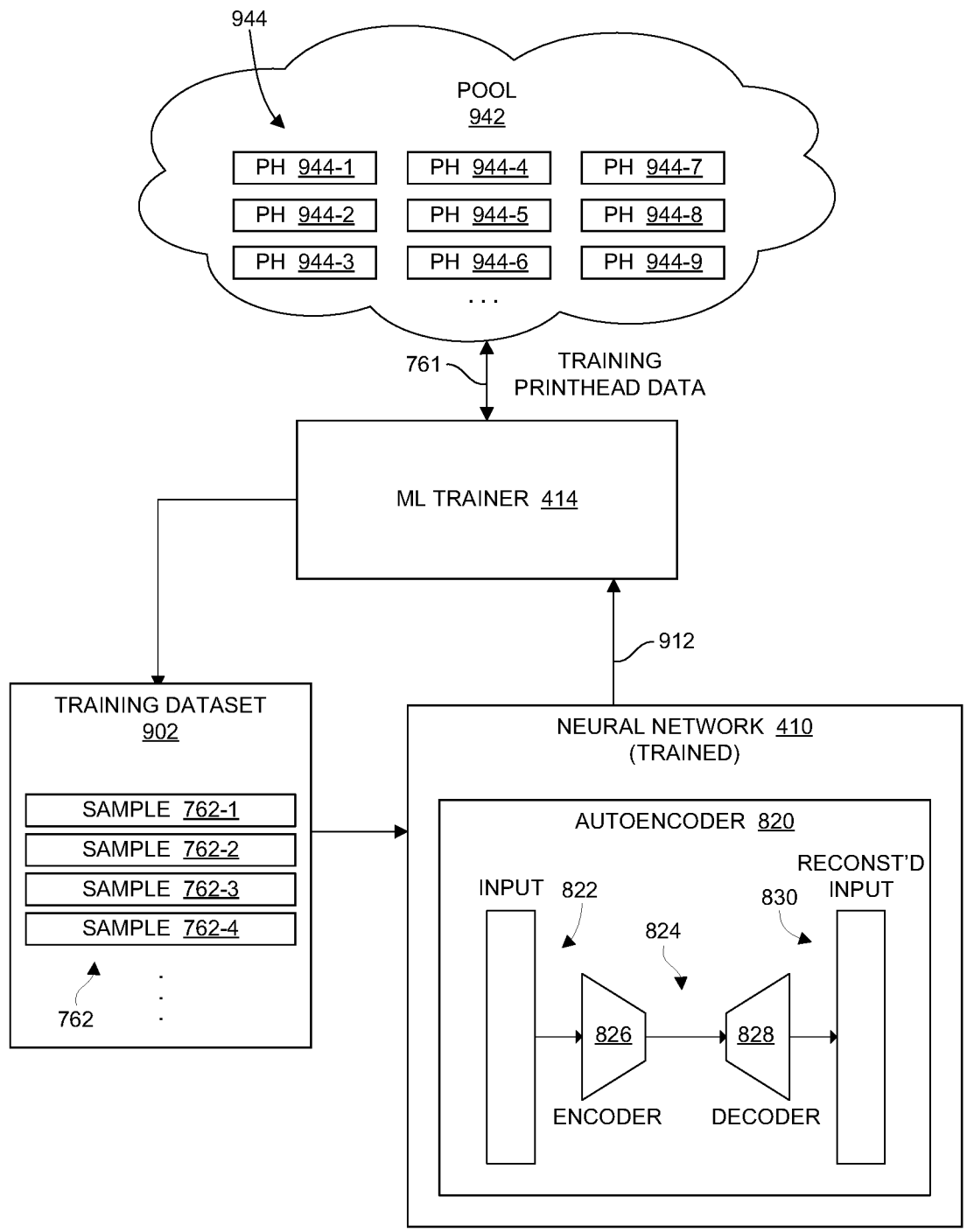
FIG. 9A illustrates determining training anomaly scores for training printheads using a neural network in an illustrative embodiment.

FIG. 9A illustrates determining training anomaly scores 712 for training printheads using neural network 410 in an illustrative embodiment. ML trainer 414 has access to training printhead data 761 for a group or pool 942 of training printheads 944. Training printheads 944 in pool 942 may comprise printheads of a particular printer (e.g., indicated by serial number), a particular type of printhead or a particular type of printer (e.g., indicated by model number, manufacturer, etc.), printheads of a printer(s) operated by a particular customer, print shop, etc., or some other collection of printheads that are desired for training recurrent neural network 412. ML trainer 414 generates a training dataset 902 for training recurrent neural network 412 based on the training printhead data 761 from the training printheads 944. The training dataset 902 includes training samples 762 (e.g., 762-1, 762-2, . . . ) for multiple training printheads 944. ML trainer 414 formats each training sample 762 of training dataset 902 to include training printhead data 761, or a desired subset of training printhead data 761, for a training printhead 944. The structure of a training sample 762 (i.e., the training printhead data 761 included in the training sample 762) may have a similar structure as training samples 760. ML trainer 414 inputs the training samples 762 from training dataset 902 into neural network 410 to generate training anomaly scores 712 for the training printheads 944.

As an example, for each training printhead 944, ML trainer 414 inputs a training sample 762 of training printhead data 761 as input data into neural network 410. Neural network 410 reconstructs or regenerates the input data, and outputs an output representation 912 of the input data (also referred to as the reconstructed input). ML trainer 414 determines a reconstruction error or reconstruction loss of the output representation 912, which is a difference between the input data and the output representation 912. ML trainer 414 may determine the reconstruction error based on a loss function, such as root mean square or cross-entropy between the input data and the output representation 912. The reconstruction error indicates or comprises the training anomaly score 712 for the training printhead 944. One technical benefit of trained neural network 410 generating anomaly scores is that the anomaly score (e.g., reconstruction error for input data) for non-conforming printheads will be comparatively larger than the anomaly score for conforming printheads, and this allows for improved detection of non-conforming printheads. ML trainer 414 performs a similar process for each of the training printheads 944.

Figure 9B:
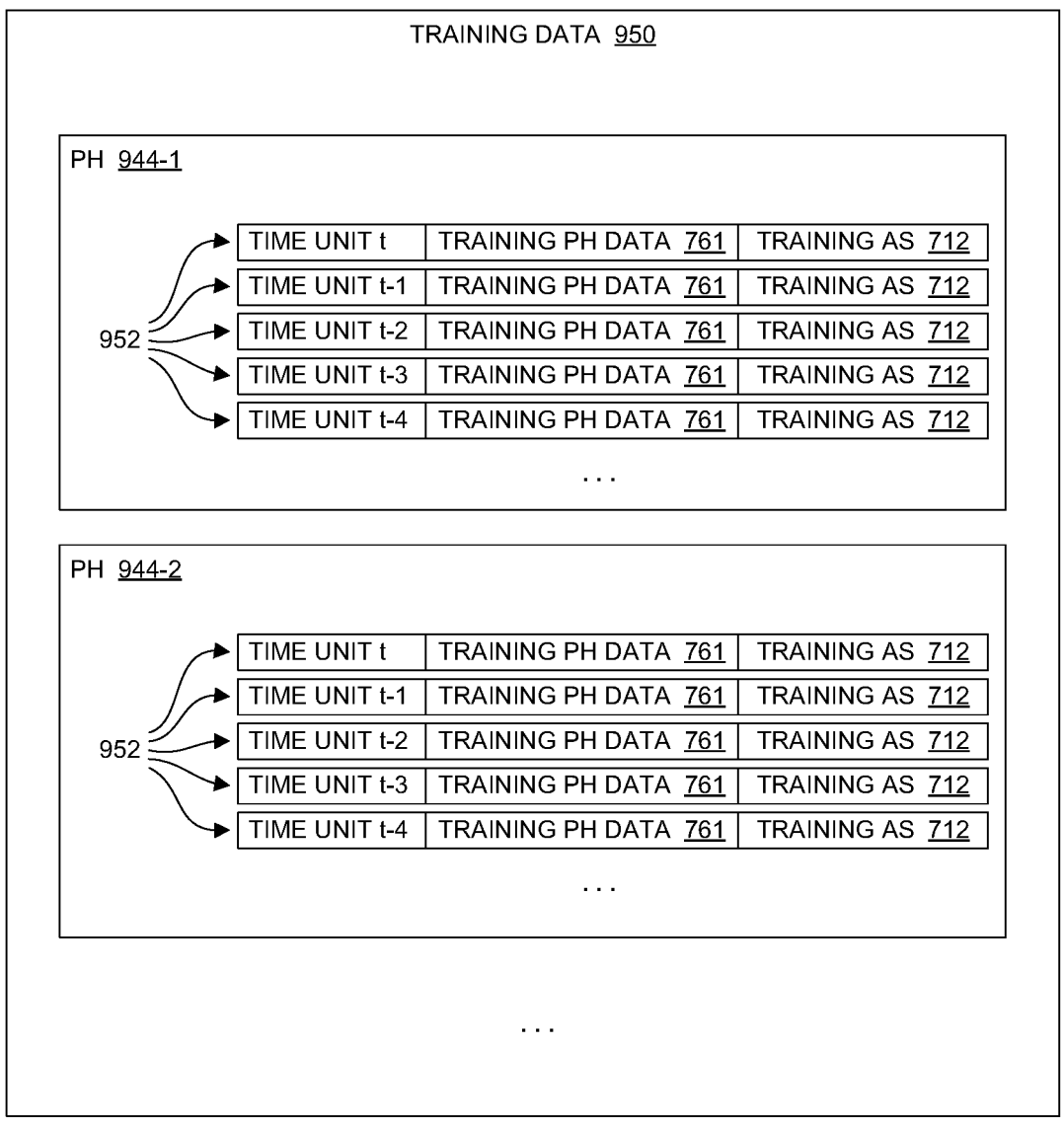
FIG. 9B illustrates training data generated by an ML trainer using a neural network in an illustrative embodiment.

The training anomaly scores 712 are also determined across multiple time units (e.g., across multiple days). ML trainer 414 inputs training samples 762 for the training printheads 944 over a sequence of consecutive time units into neural network 410 to determine training anomaly scores 712 over the sequence of consecutive time units. FIG. 9B illustrates training data 950 generated by ML trainer 414 using neural network 410 in an illustrative embodiment. For training printhead 944-1, for example, ML trainer 414 enters training samples 762 over a sequence of consecutive time units 952 into neural network 410 to determine training anomaly scores (AS) 712 over the sequence of consecutive time units 952. Thus, the training data 950 includes a training anomaly score 712 generated for training printhead 944-1 by neural network 410 for each individual time unit 952. For training printhead 944-2, for example, ML trainer 414 inputs training samples 762 over a sequence of consecutive time units 952 into neural network 410 to determine training anomaly scores 712 over the sequence of consecutive time units 952. Thus, the training data 950 also includes a training anomaly score 712 generated for training printhead 944-2 by neural network 410 for each individual time unit 952. ML trainer 414 may operate in a similar manner for the pool 942 of training printheads 944 to generate the training data 950. This training data 950 may then be used to train recurrent neural network 412.

Figure 10:
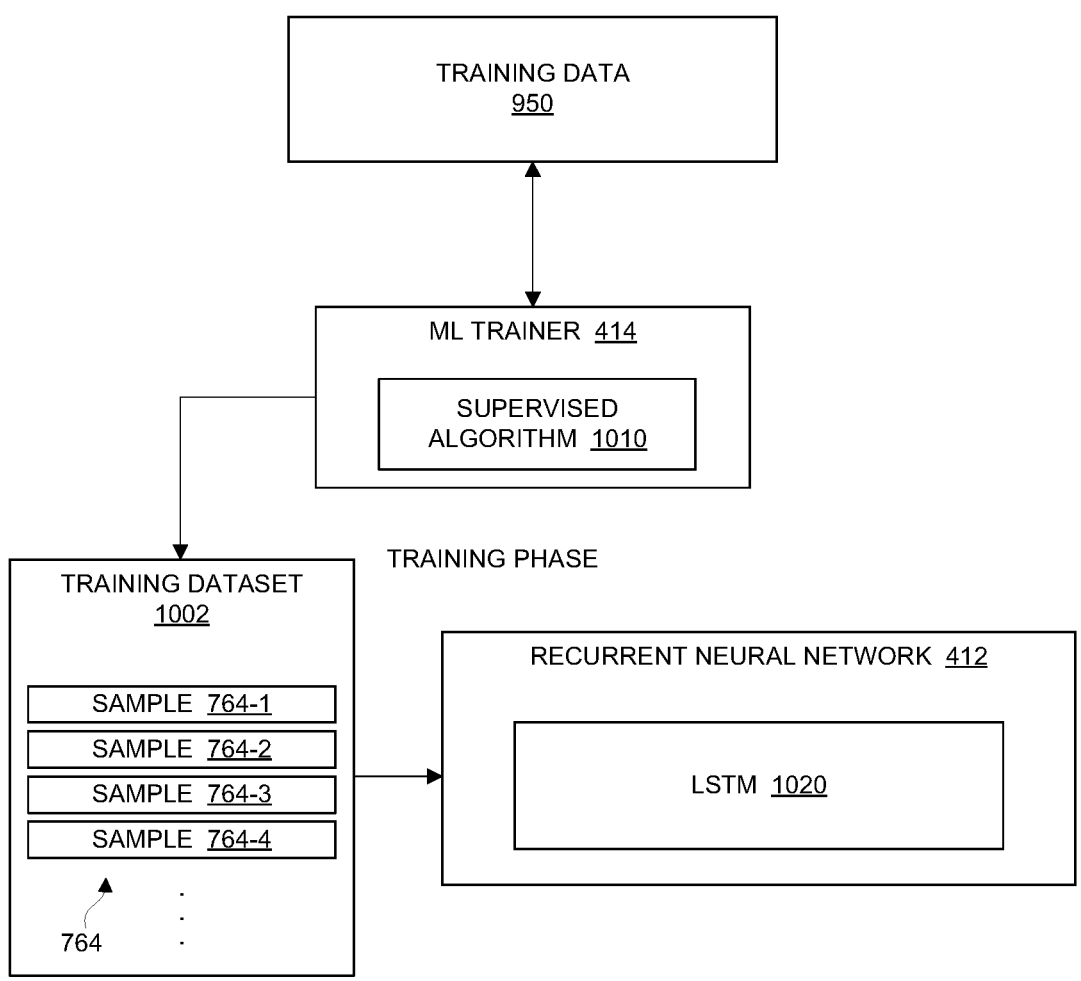
FIG. 10 illustrates training of a recurrent neural network in an illustrative embodiment.

FIG. 10 illustrates training of recurrent neural network 412 in an illustrative embodiment. During the training phase 780, ML trainer 414 trains recurrent neural network 412 using a supervised learning algorithm 1010 based on a training dataset 1002. ML trainer 414 may access training data 950 as shown in FIG. 9B for multiple training printheads 944 to generate training dataset 1002. The training dataset 1002 therefore includes training samples 764 (e.g., 764-1, 764-2, . . . ) for multiple training printheads 944. ML trainer 414 formats each training sample 764 to have a structure or format comprising a training anomaly score 712 and training printhead data 761 or a subset of the training printhead data 761 over multiple time units 952 (i.e., a sequence of consecutive time units 952), and a corresponding label. The training printhead data 761 used in training recurrent neural network 412 may vary as a matter of design choice. For example, the training printhead data 761 used in training dataset 1002 may comprise nozzle failure data, such as a number of nozzles 306 identified with a nozzle failure defect 746. In another example, the training printhead data 761 used in training dataset 1002 may comprise a number of nozzles 306 with a nozzle failure defect 746 along with print speed 749 and/or print resolution 750. In another example, the training printhead data 761 used in training dataset 1002 may comprise other defect information 743, maintenance information 747, and/or any other desired data.

Figure 11:
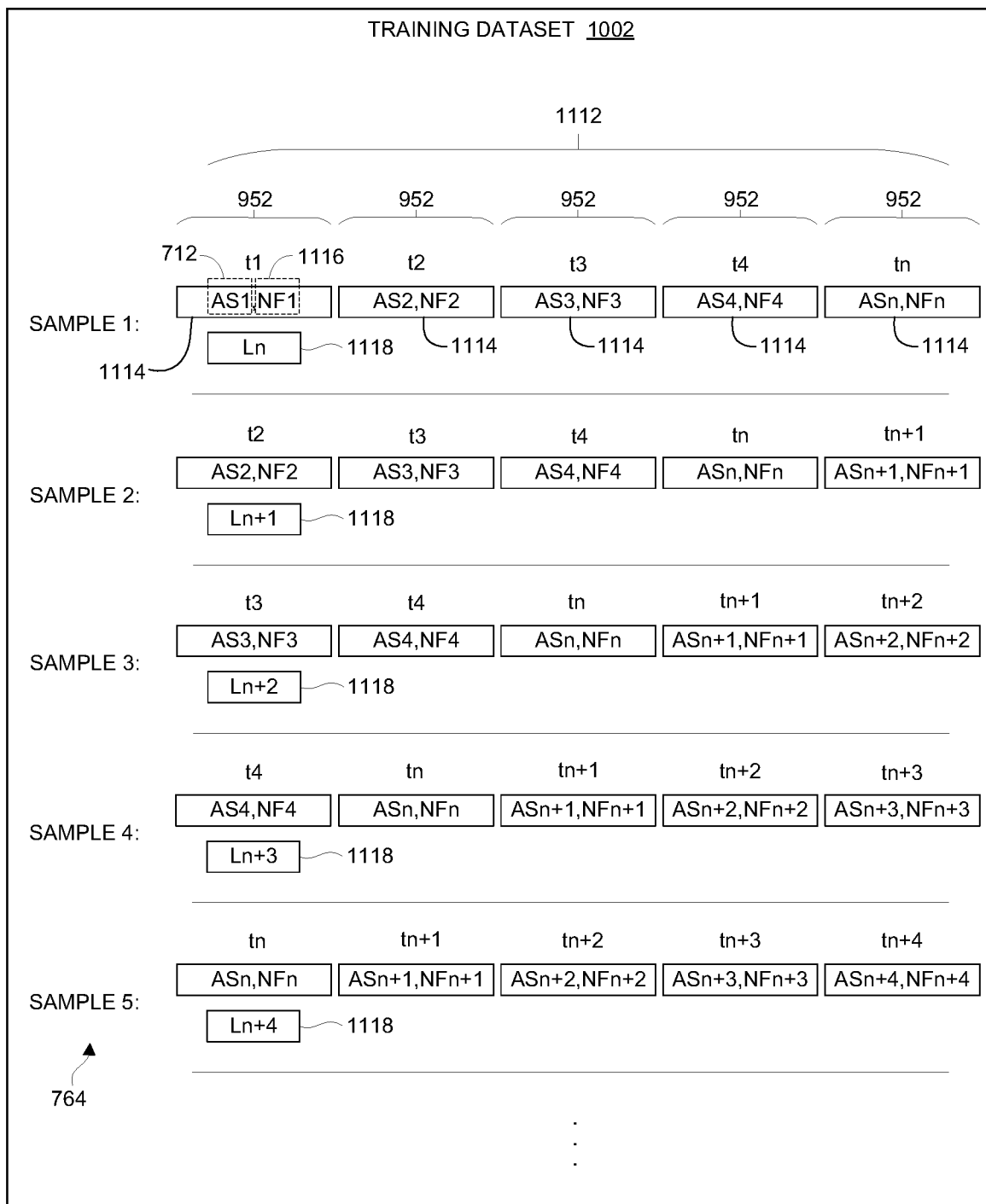
FIG. 11 illustrates a training dataset of a training printhead in an illustrative embodiment.

FIG. 11 illustrates training dataset 1002 of a training printhead 944 in an illustrative embodiment. In this embodiment, the training dataset 1002 includes training samples 764 for training printhead 944, and ML trainer 414 formats each of the training samples 764 as a structured time-series 1112 of training data objects 1114 over a number of consecutive time units 952. As illustrated in FIG. 11, a time-series 1112 of training data objects 1114 is an arbitrary length of n consecutive time units 952. Sample 1, for example, includes training data objects 1114 over the consecutive time units 952 of t1 through tn. Sample 2, for example, includes training data objects 1114 over the consecutive time units 952 of t2 through tn−1. Sample 3, for example, includes training data objects 1114 over the consecutive time units 952 of t3 through tn+2. In this example, Sample 1 starts at the first time unit t1 and has an arbitrary length of n consecutive time units 952 (where n=5). The next sample (Sample 2) progresses in time by one time unit 952 as compared to the prior Sample 1. For example, Sample 2 starts at the second time unit t2 and ends at time unit tn+1. The next sample (Sample 3) again progresses in time by one time unit 952 as compared to the prior Sample 2. For example, Sample 3 starts at the third time unit t3 and ends at time unit tn+2. Training samples 764 may progress in a similar manner for a desired number of training samples 764. In other examples, the training samples 764 may progress by a different number of time units 952 other than one.

Each training data object 1114 of a training sample 764 includes a training anomaly score 712, and training printhead data 761 or a subset of the training printhead data 761 corresponding with a time unit 952 (see also, FIG. 9B). For example, the first training data object 1114 of Sample 1 includes a training anomaly score 712 (AS1) and training printhead data 761 (e.g., NF1) corresponding with time unit (t1). The subset of training printhead data 761 included in a training data object 1114 may vary as desired. For example, the subset of training printhead data 761 illustrated in FIG. 11 is a nozzle failure value (NF) 1116. A nozzle failure value 1116 is a value indicating partial or total nozzle failure of an individual printhead for a time unit 952. For example, a nozzle failure value 1116 may comprise a number of failed nozzles 306 (e.g., number of nozzles 306 with a nozzle failure defect 746), a percentage of failed nozzles 306, or some other value indicating nozzle failure. One technical benefit of using the nozzle failure value 1116 is the number of failed nozzles 306, for example, may distinguish a structural failure from a non-structural failure (e.g., clogged nozzle). In other embodiments, the subset of training printhead data 761 in a training data object 1114 may include print speed 749, print resolution 750, and/or other training printhead data 761.

The training samples 764 also each include a label 1118. In an embodiment, the label 1118 for a training sample 764 may represent a printhead condition (i.e., operating health or state) of the training printhead 944. As in FIG. 11, label 1118 may represent a printhead condition corresponding with the last time unit 952 in the time-series 1112 of training data objects 1114. For example, in FIG. 11, the label 1118 for Sample 1 may represent the printhead condition of the training printhead 944 at time tn, the label 1118 for Sample 2 may represent the printhead condition of the training printhead 944 at time tn+1, etc. One technical benefit is the label 1118 indicates the health of a training printhead 944 for accurate training. The label 1118 may comprise a binary value, and a value of "1" may be assigned to a training printhead 944 with a failure or unhealthy condition, and a value of "0" may be assigned to a training printhead 944 with a normal or healthy condition. In an embodiment, the printhead condition (e.g., normal or failure) may be assigned by an expert, a human rater, or another type of rater (e.g., ML system). In an embodiment, the printhead condition may be assumed based on the replacement status of the training printhead 944. For example, a value of "1" may be assigned to a training printhead 944 before replacement, and a value of "0" may be assigned to a training printhead 944 after replacement (i.e., training printhead 944 is assumed to have normal operation when recently replaced). A threshold time may be defined to distinguish before and after replacement, such as six months, one year, two years, etc.

Training dataset 1002 as illustrated in FIG. 11 includes training samples 764 for a single training printhead 944, but it is understood that training dataset 1002 includes training samples 764 for multiple training printheads 944.

In an embodiment, recurrent neural network 412 in FIG. 10 may comprise a Long Short-Term Memory (LSTM) neural network 1020. An LSTM neural network 1020 is a type of recurrent neural network capable of learning order dependence in sequence prediction problems. One technical benefit of using an LSTM neural network 1020 is an LSTM can efficiently learn long-term dependencies. Although an LSTM neural network 1020 is indicated in FIG. 10, other types of neural networks may be considered for recurrent neural network 412.

Training of neural networks may be considered complete when training targets are met. For example, training of neural network 410 may be considered complete when reconstruction loss for conforming printhead data 759 reaches a minimum threshold target. In another example, validation testing may be applied by comparing the neural network output response to the input conforming printhead validation data, and calculating the reconstruction error. Training can be stopped when the training loss is decreasing while validation loss starts increasing.

Testing/Deployment Phase

When neural network 410 and recurrent neural network 412 are trained, printhead maintenance supervisor 400 may use neural network 410 and recurrent neural network 412 in a testing phase and/or deployment phase 782 for a printer maintenance service 510. In the following, a trained neural network 410 will be referred to simply as neural network 410 and trained recurrent neural network 412 will be referred to as recurrent neural network 412, and this may be further confirmed from the context. Assume for the following embodiment that printhead maintenance supervisor 400 monitors printheads 104 of printer 521 as shown in FIG. 7A. As described above, maintenance controller 406 collects printhead data 704 from printer 521, and maintains data logs 720 for the printheads 104. Printheads 104 being monitored in testing/deployment phase 782 may be referred to generally as deployed printheads, and the printhead data 704 collected for the deployed printheads may be referred to as deployed printhead data.

Figure 12A:
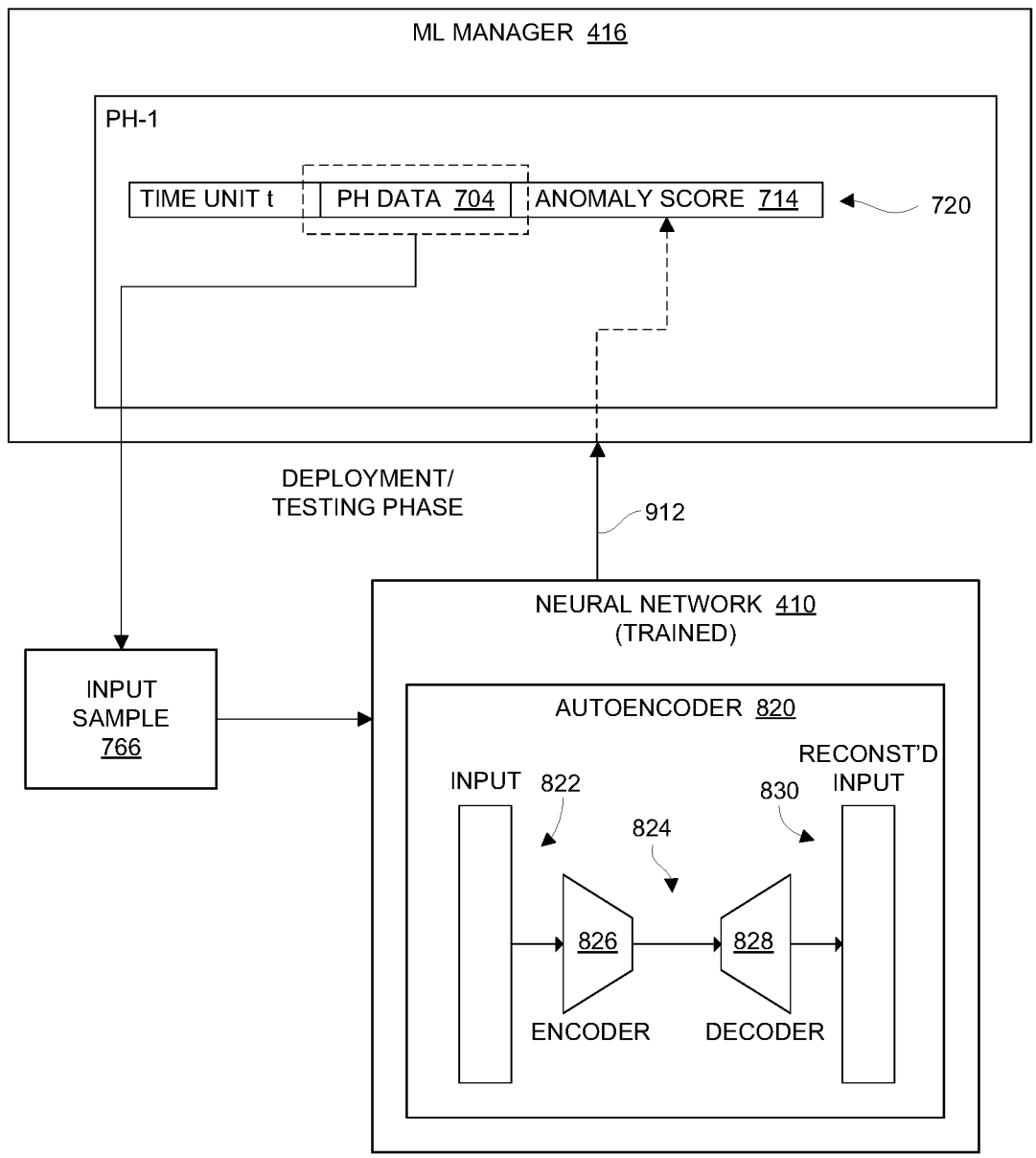
FIGS. 12A-12E illustrate determining deployment anomaly scores for printheads using a neural network in an illustrative embodiment.

FIGS. 12A-12E illustrate determining deployment anomaly scores 714 for printheads 104 using neural network 410 in an illustrative embodiment. In FIG. 12A, ML manager 416 identifies printhead data 704 for printheads 104 of printer 521. For example, ML manager 416 may identify a data log 720 for a printhead 104 (e.g., PH-1) that contains printhead data 704 for the present time unit (1). ML manager 416 formats an input sample 766 (also referred to as a test sample or deployment sample) that includes printhead data 704, or a desired subset of printhead data 704, for the printhead 104. The structure of an input sample 766 (i.e., the printhead data 704 included in the input sample 766) may have a similar structure as training samples 760. ML manager 416 inputs the input sample 766 as input data into neural network 410 for the present time unit (1). Neural network 410 reconstructs or regenerates the input data, and outputs an output representation 912 of the input data (also referred to as the reconstructed input). ML manager 416 determines a reconstruction error or reconstruction loss of the output representation 912, which indicates or comprises the deployment anomaly score 714 for the printhead 104 (i.e., PH-1) at the present time unit (1). ML manager 416 may then store the deployment anomaly score 714 for the printhead 104 in the data log 720 for the present time unit (1) as illustrated in FIG. 12A.

Figure 12B:
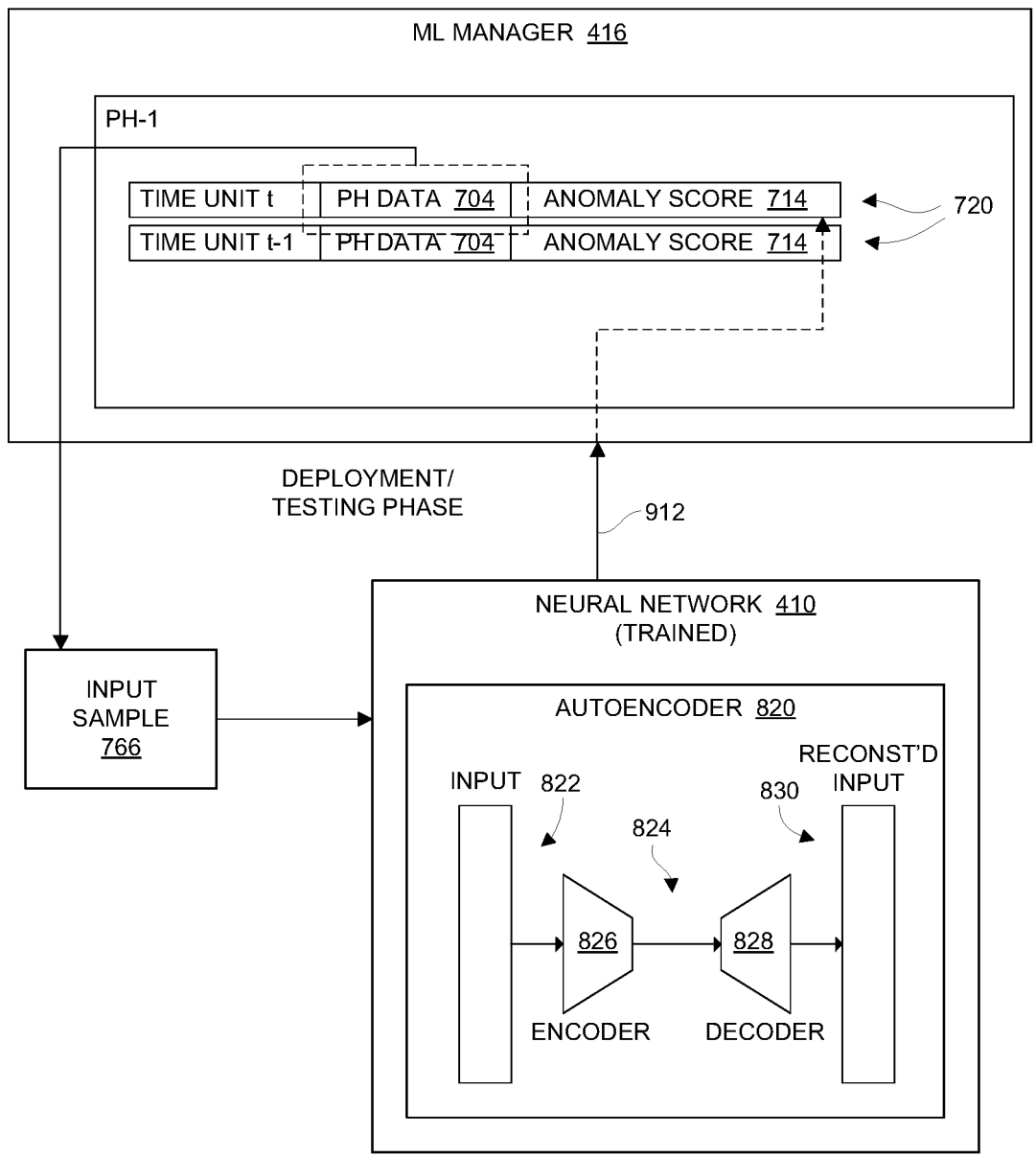
Figure 12C:
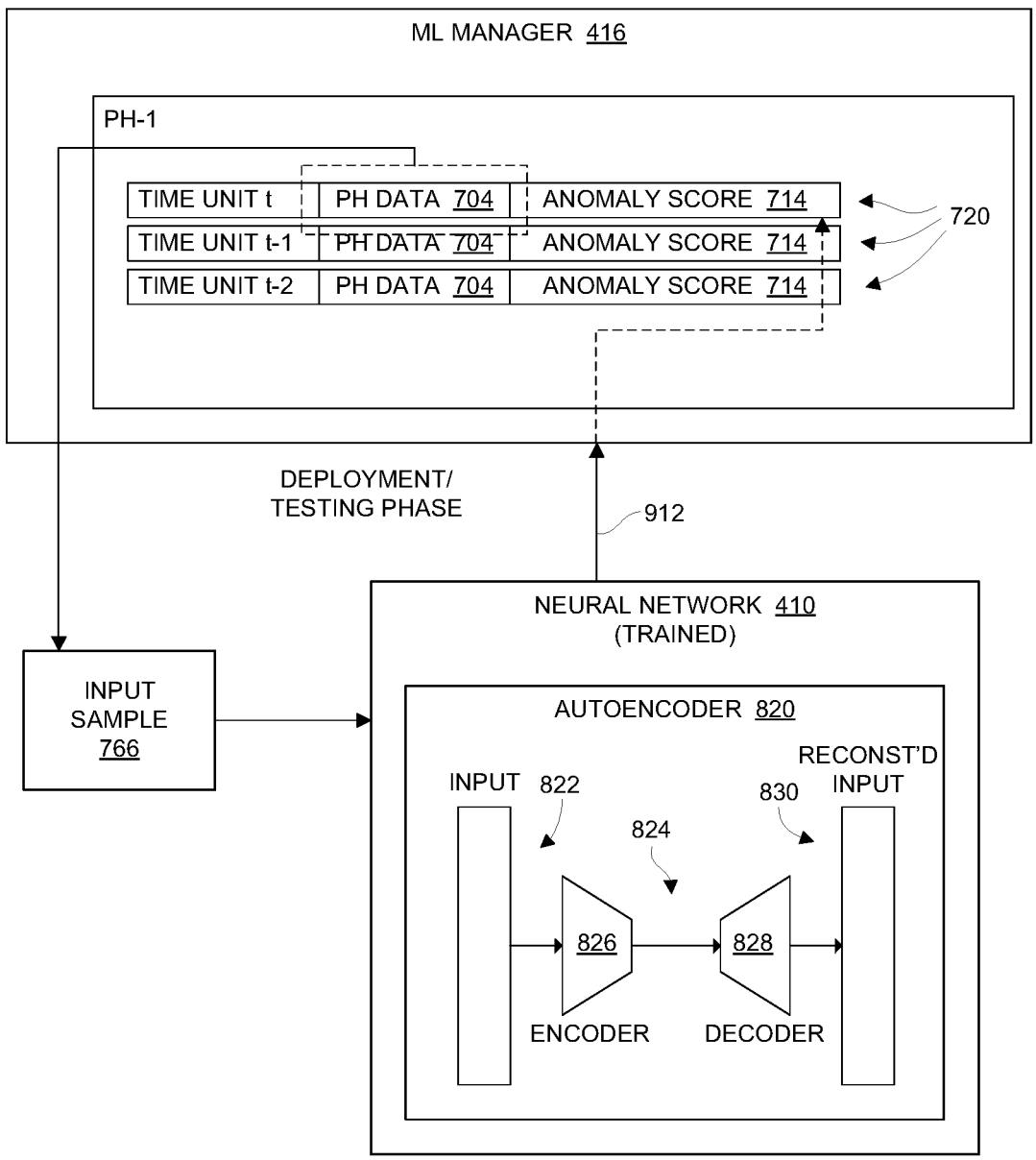
Figure 12D:
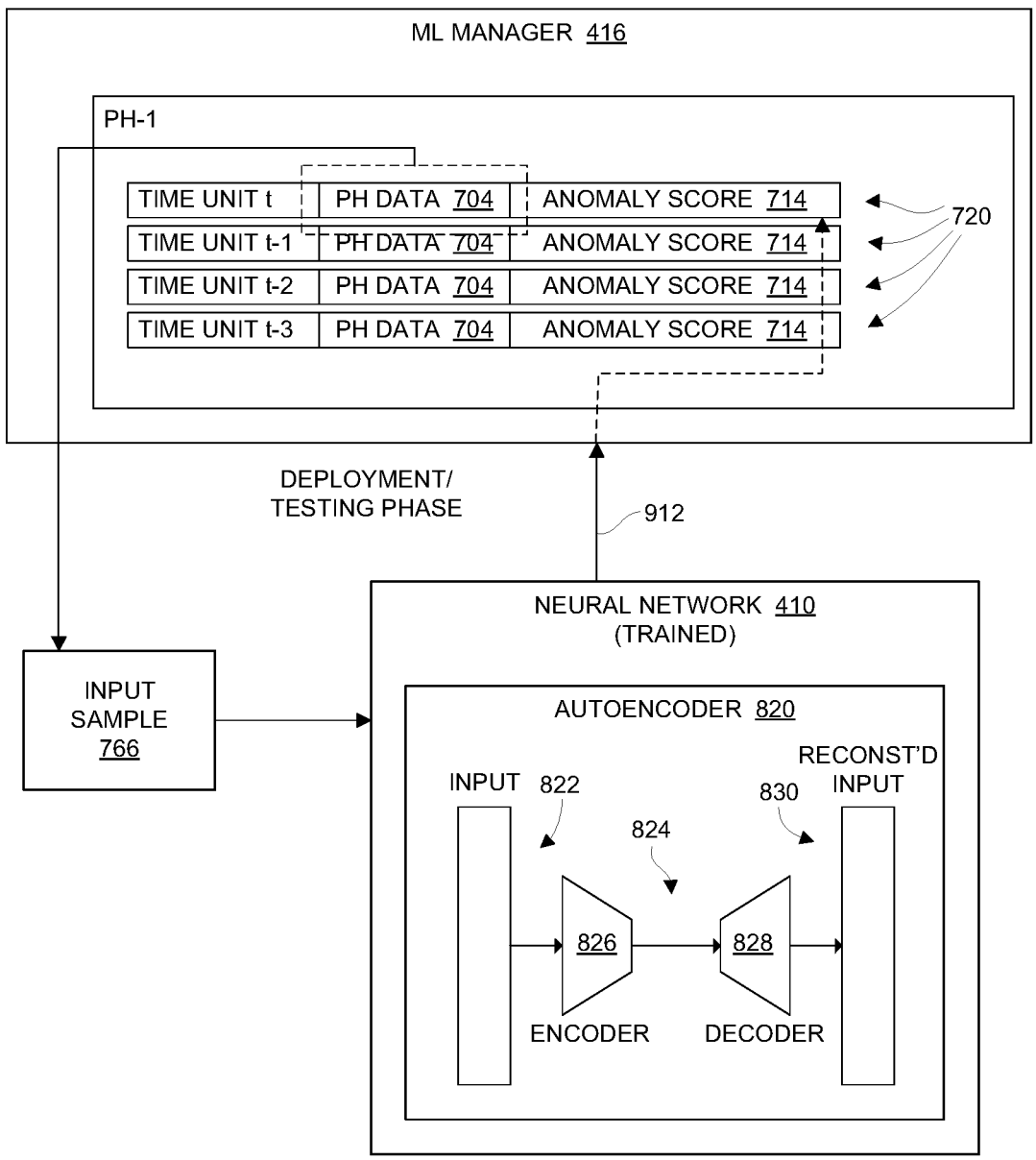
Figure 12E:
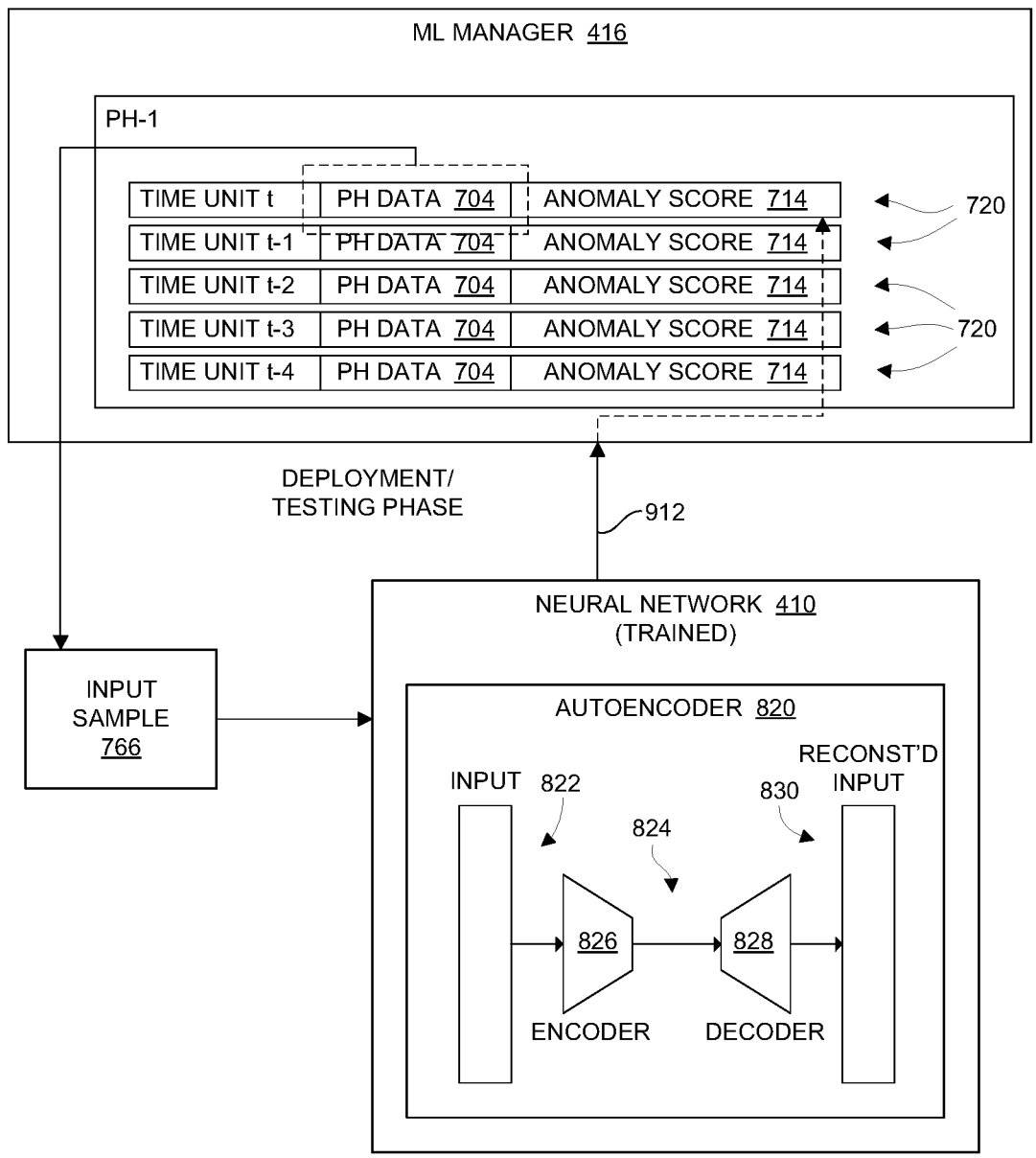

ML manager 416 may determine deployment anomaly scores 714 for printhead 104 periodically, such as daily. When the next time unit is reached, ML manager 416 repeats this process and inputs an input sample 766 as input data into neural network 410 for the present time unit (1) as shown in FIG. 12B. Neural network 410 reconstructs the input data, and outputs an output representation 912 of the input data. ML manager 416 determines a reconstruction error of the output representation 912, which indicates or comprises the deployment anomaly score 714 for the printhead 104 (i.e., PH-1) at the present time unit (1). ML manager 416 may then store the deployment anomaly score 714 for the printhead 104 in the data log 720 for the present time unit (1). As also illustrated in FIG. 12B, ML manager 416 stores a past or prior data log 720 of the previous time unit (t−1). This process repeats as ML manager 416 determines deployment anomaly scores 714 for the printhead 104 (i.e., PH-1) over multiple time units, such as for time units (1, t−1, and t−2) as in FIG. 12C, for time units (1, t−1, t−2, and t−3) as in FIG. 12D, and for time units (1, t−1, t−2, t−3, and t−4) as in FIG. 12E.

ML manager 416 may perform a similar process to determine deployment anomaly scores 714 for other printheads 104 of printer 521 at the time units. When deployment anomaly scores 714 are determined for a sufficient or desired number of time units, ML manager 416 may use recurrent neural network 412 to scale the deployment anomaly scores 714.

Figure 13:
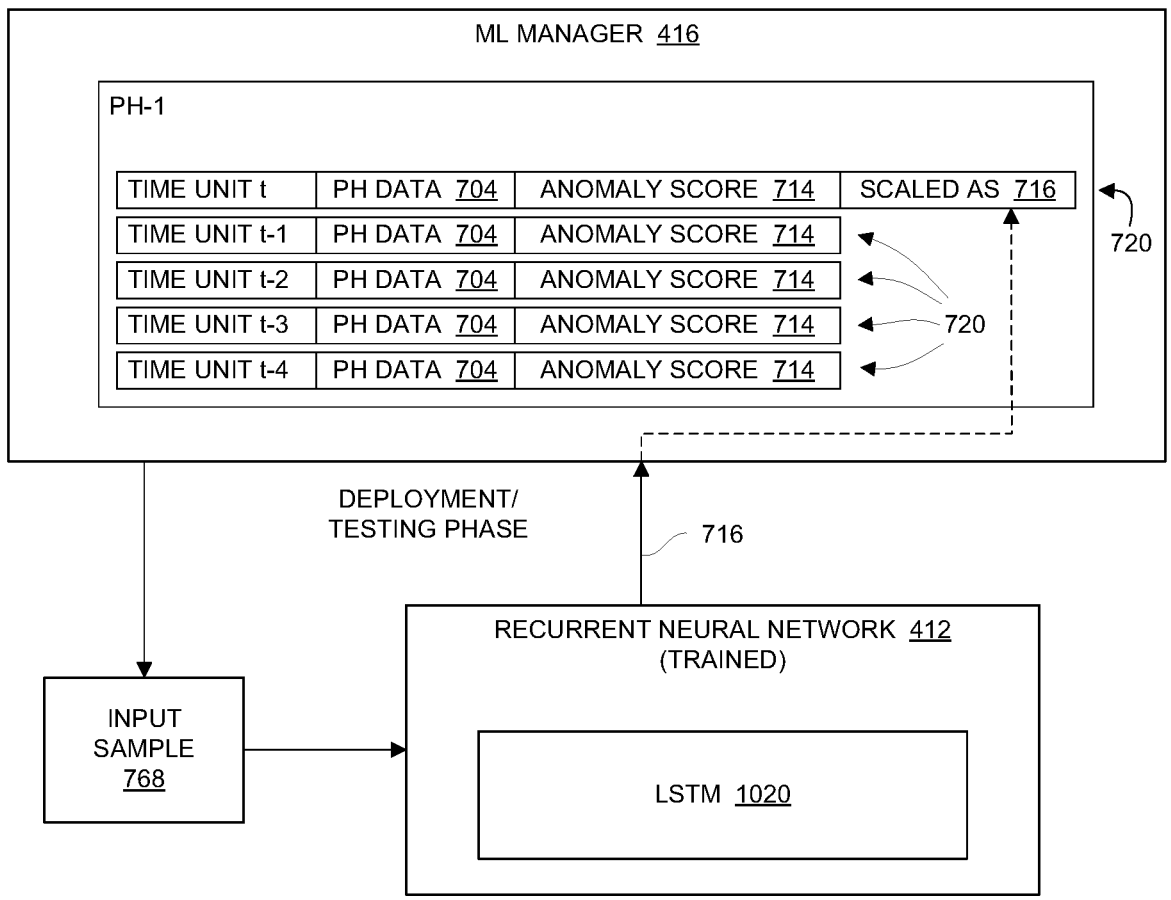
FIG. 13 illustrates scaling of deployment anomaly scores for printheads using a recurrent neural network in an illustrative embodiment.
Figure 14:
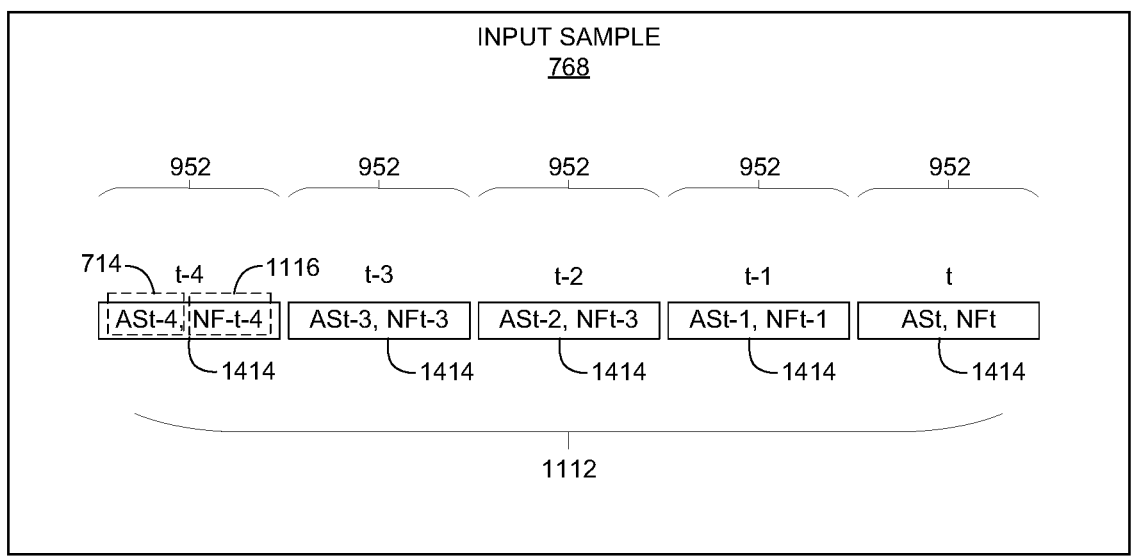
FIG. 14 illustrates an input sample in an illustrative embodiment.

FIG. 13 illustrates scaling of deployment anomaly scores 714 for printheads 104 using recurrent neural network 412 in an illustrative embodiment. To scale the deployment anomaly score 714 for the present time unit (1), for example, ML manager 416 formats an input sample 768. An input sample 768 has a structure or format similar to a training sample 764 of training dataset 1002, but lacks a corresponding label. FIG. 14 illustrates an input sample 768 in an illustrative embodiment. For example, ML manager 416 may format an input sample 768 as a structured time-series 1112 of deployment data objects 1414 over consecutive time units 952, similar to a training sample 764. In an embodiment, the time-series 1112 of deployment data objects 1414 may include the present time unit (1), or most recent time unit, along with a configurable number of past or previous consecutive time units (e.g., t−1, t−2, t−3, and t−4). As illustrated in FIG. 14, a time-series 1112 may comprise five consecutive time units 952, but it is understood that the time-series 1112 may be any arbitrary length of n consecutive time units 952.

Each deployment data object 1414 of an input sample 768 includes a deployment anomaly score 714, and printhead data 704 or a subset of the printhead data 704 corresponding with a time unit 952. The subset of printhead data 704 included in a deployment data object 1414 may vary as desired as with training samples 764. For example, the subset of printhead data 704 illustrated in FIG. 14 is a nozzle failure value (NF) 1116, which may comprise a number of failed nozzles 306 (e.g., number of nozzles 306 with a nozzle failure defect 746), a percentage of failed nozzles 306, or some other value. In other embodiments, the subset of printhead data 704 in a deployment data object 1414 may include print speed 749, print resolution 750, and/or other printhead data 704.

In FIG. 13, ML manager 416 inputs the input sample 768 for printhead 104 (also referred to as a target printhead) as input data into recurrent neural network 412. Recurrent neural network 412 outputs an output value based on the input data, such as a value between "0" and "1". The output value represents a scaled anomaly score 716 for the present time unit (t). ML manager 416 may then store the scaled anomaly score 716 (scaled AS) for the printhead 104 in the data log 720 for the present time unit (1) as illustrated in FIG. 13. ML manager 416 may scale the deployment anomaly score 714 at the present time unit (1) if historical data is available for at least n prior consecutive time units 952. For example, in FIG. 13, ML manager 416 may scale the deployment anomaly score 714 at the present time unit (1) if the historical data includes at least four prior consecutive time units 952. ML manager 416 may scale the deployment anomaly scores 714 for future time units (e.g., t+1, t+2, etc.) if the last n consecutive time units 952 are available.

ML manager 416 may repeat this process for each of the printheads 104 of the printer 521. Thus, the data logs 720 for each printhead 104 may include printhead data 704, (unscaled) anomaly scores 714, and scaled anomaly scores 716 over a time period. Maintenance controller 406 may process the data logs 720 to determine whether to recommend replacement of one or more of the printheads 104. For a target printhead 104, for example, maintenance controller 406 may compare one or more scaled anomaly scores 716 (i.e., scaled anomaly scores 716 over one or more time units 952) to one or more predetermined threshold values. Scaled anomaly scores 716 at or near a value of "0" may indicate a printhead 104 that is operating properly. Scaled anomaly scores 716 at or near a value of "1" (e.g., 0.8, 0.9, 0.095) may indicate a printhead 104 that is experiencing a failure condition. A failure condition is a printhead condition where jetting defects of the printhead are not recoverable with cleaning or maintenance operations, such as a structural failure (e.g., delamination, damage to nozzle plate, etc.). Thus, a threshold value may be provisioned close to "1" to distinguish between printheads 104 experiencing a failure condition and those that are not, although other threshold values may be provisioned as desired. Maintenance controller 406 may identify a failure condition when the scaled anomaly score 716 for a printhead 104 exceeds a threshold value (e.g., near "1"), or a number of scaled anomaly scores 716 exceed the threshold value for a configurable number of time units 952. For example, maintenance controller 406 may identify a failure condition when the scaled anomaly scores 716 exceed the threshold value for five consecutive time units 952. One technical benefit of identifying a failure condition based on a number of scaled anomaly scores 716 exceeding the threshold value is minimizing false positive failure conditions.

When a determination is a target printhead 104 is experiencing a failure condition, maintenance controller 406 provides a replacement recommendation for the target printhead 104. For example, maintenance controller 406 may store the replacement recommendation in a data log 720 for the target printhead 104 in memory allowing other devices to access the data log 720. In another example, maintenance controller 406 may transmit a message (e.g., to a client device) through the network interface component 402 indicating the replacement recommendation for the target printhead 104. In another example, maintenance controller 406 may display the replacement recommendation for the target printhead 104 via the user interface component 404. The replacement recommendation may also include an identifier for the target printhead 104, such as the printhead identifier 739 mentioned above. Technical benefits of these implementations are replacement recommendations are provided so that printheads 104 experiencing a failure condition may be identified and replaced.

Figure 15:
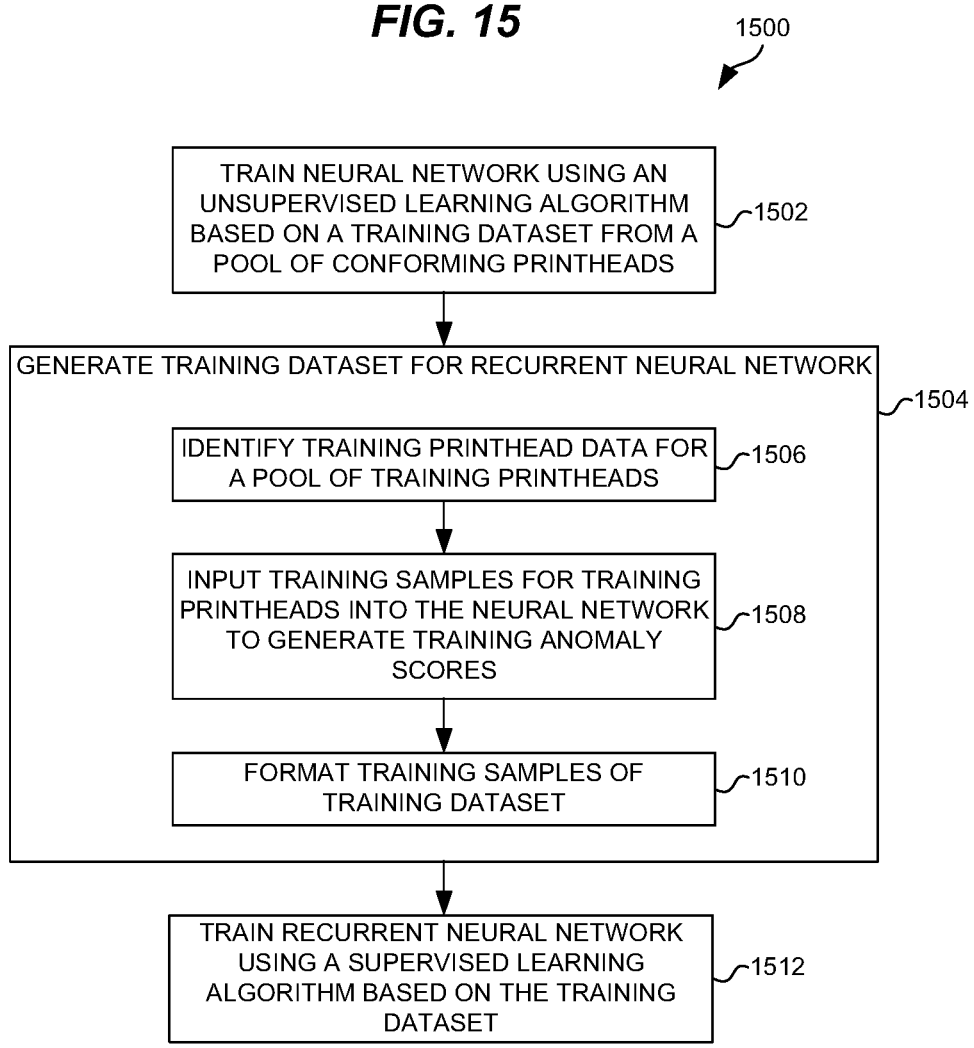
FIG. 15 is a flow chart illustrating a method of training a neural network and a recurrent neural network in an illustrative embodiment.
Figure 16:
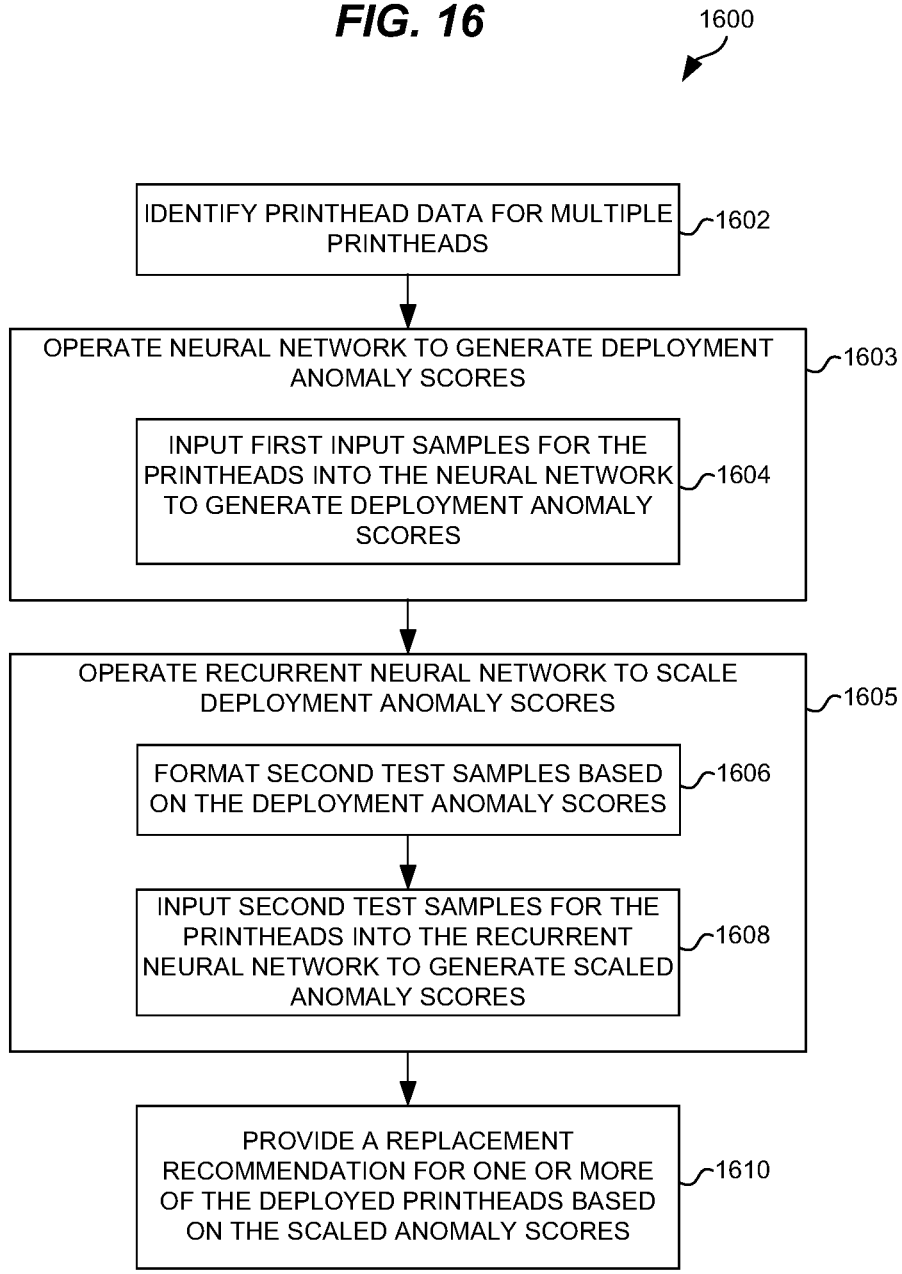
FIG. 16 is a flow chart illustrating a method of using a neural network and a recurrent neural network to provide a replacement recommendation in an illustrative embodiment.
Figure 17:
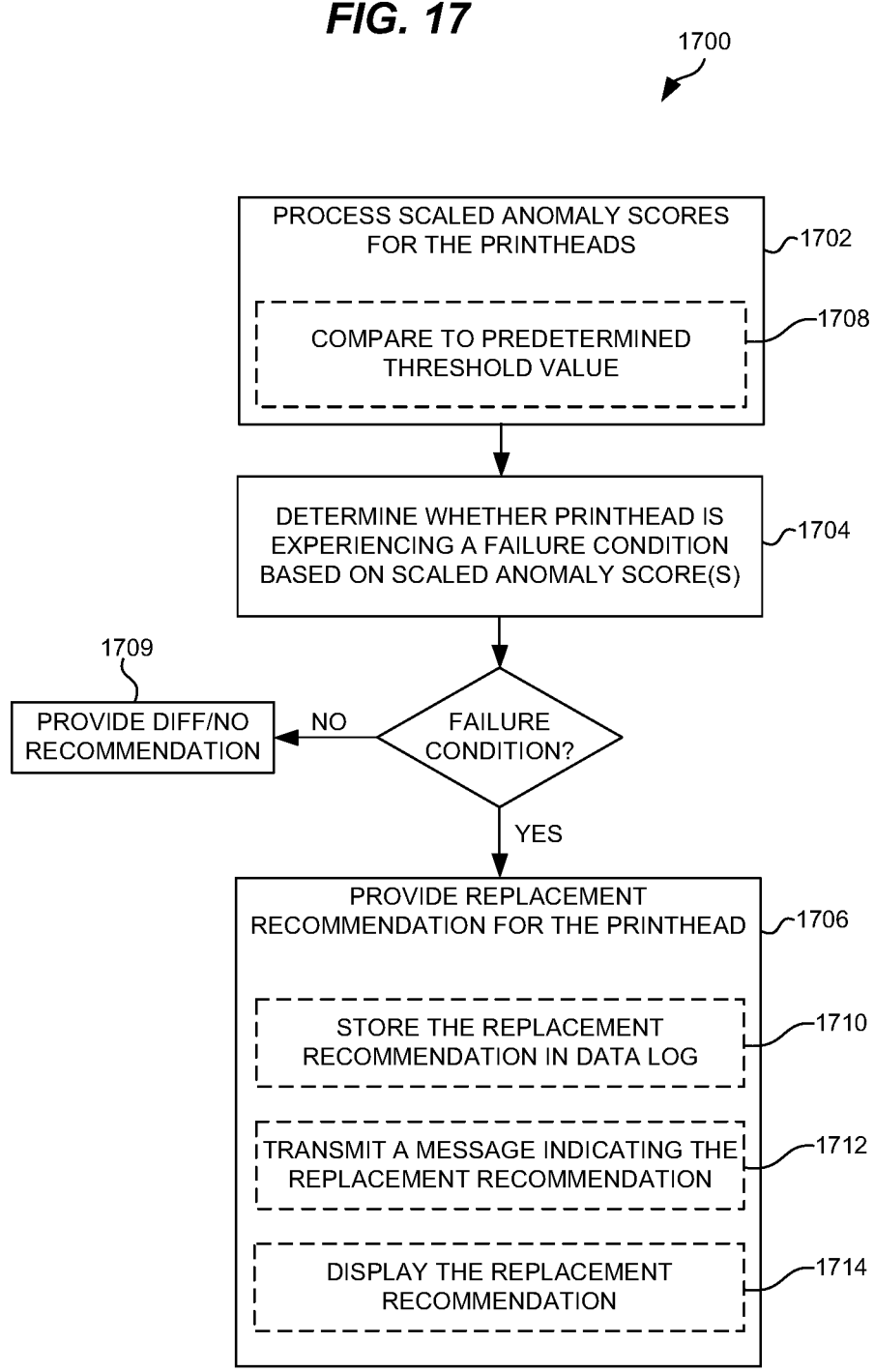
FIG. 17 is a flow chart illustrating a method of recommending replacement of printheads in an illustrative embodiment.

FIGS. 15-17 are flow charts illustrating methods of performing operations described herein. More particularly, FIG. 15 is a flow chart illustrating a method 1500 of training neural network 410 and recurrent neural network 412 in an illustrative embodiment. The steps of method 1500 will be described with reference to printhead maintenance supervisor 400 in FIG. 4, but those skilled in the art will appreciate that method 1500 may be performed in other systems or devices. Also, the steps of the flow charts described herein are not all inclusive and may include other steps not shown, and the steps may be performed in an alternative order.

In the training phase 780, ML trainer 414 trains neural network 410 (e.g., autoencoder 820) using an unsupervised learning algorithm 810 based on a training dataset 802 from a pool 842 of conforming printheads 844 (step 1502). As described above, each training sample 760 of training dataset 802 includes conforming printhead data 759, or a desired subset of conforming printhead data 759, for a conforming printhead 844. With neural network 410 trained, ML trainer 414 generates a training dataset 1002 for recurrent neural network 412 using neural network 410 (step 1504). To do so, ML trainer 414 identifies training printhead data 761 for a pool 942 of training printheads 944 over a plurality of time units 952 (step 1506). ML trainer 414 inputs training samples 762 of training printhead data 761 for the training printheads 944 into neural network 410 to generate training anomaly scores 712 for the training printheads 944 over a plurality of time units 952 (step 1508).

For example, ML trainer 414 may perform the following over multiple time units 952. For each training printhead 944, ML trainer 414 formats a training sample 762 and inputs the training sample 762 as input data into neural network 410. The neural network 410 reconstructs or regenerates the input data, and outputs an output representation 912 of the input data. ML trainer 414 determines a reconstruction error of the output representation 912, which indicates the training anomaly score 712 for the training printhead 944. ML trainer 414 may then store the training anomaly score 712 in a data log of the training printhead 944 associated with a time unit 952.

With training anomaly scores 712 determined over multiple time units 952, ML trainer 414 formats training samples 764 of training dataset 1002 based on the training anomaly scores 712 (step 1510). The training dataset 1002 includes training samples 764 for multiple training printheads 944. As shown in FIG. 11, the training samples 764 of the training dataset 1002 have a structure or format comprising a training anomaly score 712 and training printhead data 761 (e.g., nozzle failure value 1116) over multiple time units 952, and a corresponding label 1118. ML trainer 414 then trains recurrent neural network 412 using a supervised learning algorithm 1010 based on the training dataset 1002 (step 1512).

When neural network 410 and recurrent neural network 412 are trained, printhead maintenance supervisor 400 may use neural network 410 and recurrent neural network 412 in a testing/deployment phase 782 for a printer maintenance service 510. FIG. 16 is a flow chart illustrating a method 1600 of using neural network 410 and recurrent neural network 412 to provide a replacement recommendation in an illustrative embodiment. Assume for the following embodiment that printhead maintenance supervisor 400 monitors printheads 104 of printer 521 as shown in FIG. 7A. ML manager 416 identifies printhead data 704 for a plurality of printheads 104 of printer 521 (step 1602), as the printhead data 704 is collected and maintained in data logs 720 for the printheads 104 as described in FIG. 7A. ML manager 416 operates or implements neural network 410 to generate deployment anomaly scores 714 for the printheads 104 (step 1603). For example, ML manager 416 formats input samples 766, and inputs the input samples 766 of printhead data 704 for the printheads 104 (i.e., deployed printheads) into neural network 410 to generate deployment anomaly scores 714 for the printheads 104 over a plurality of time units 952 (step 1604).

As an example, for each printhead 104, ML manager 416 identifies a data log 720 for the printhead 104 that contains printhead data 704 for the present time unit (1). ML manager 416 formats an input sample 766 that includes printhead data 704, and inputs the input sample 766 as input data into neural network 410 for the present time unit (1). Neural network 410 reconstructs or regenerates the input data, and outputs an output representation 912 of the input data. ML manager 416 determines a reconstruction error of the output representation 912, which indicates the deployment anomaly score 714 for the printhead 104 at the present time unit (1). ML manager 416 may then store the deployment anomaly score 714 for the printhead 104 in the data log 720 for the present time unit (1). When the next time unit 952 is reached, ML manager 416 repeats this process.

ML manager 416 operates or implements recurrent neural network 412 to scale the deployment anomaly scores 714 for the printheads 104 to produce scaled anomaly scores 716 for the printheads 104 (step 1605). For example, when deployment anomaly scores 714 are determined for a sufficient or desired number of time units 952 (i.e., a threshold number of time units 952), ML manager 416 may use recurrent neural network 412 to scale the deployment anomaly scores 714. ML manager 416 formats input samples 768 for the printheads 104 based on the deployment anomaly scores 714 (step 1606). As described above, each of the input samples 768 comprises a time-series 1112 of deployment data objects 1414 over a number of consecutive time units 952, and each deployment data object 1414 includes a deployment anomaly score 714, and printhead data 704 or a subset of the printhead data 704 corresponding with a time unit. ML manager 416 then inputs the input samples 768 for printheads 104 into recurrent neural network 412 to output scaled anomaly scores 716 (step 1608).

As an example, for each printhead 104, ML manager 416 formats input sample 768 for a present time unit (1). ML manager 416 inputs the input sample 768 for the printhead 104 as input data into recurrent neural network 412. Recurrent neural network 412 outputs an output value (e.g., between "0" and "1") based on the input data. The output value represents a scaled anomaly score 716 for the present time unit (t). ML manager 416 may then store the scaled anomaly score 716 for the printhead 104 in the data log 720 for the present time unit (1). When the next time unit 952 is reached, ML manager 416 repeats this process.

Maintenance controller 406 then provides a replacement recommendation for one or more of the deployed printheads 104 based on the scaled anomaly scores 716 for the deployed printheads 104 (step 1610). One technical benefit is printhead maintenance supervisor 400 is able to provide a replacement recommendation with reasonable accuracy based on the scaled anomaly scores 716.

FIG. 17 is a flow chart illustrating a method 1700 of recommending replacement of printheads 104 in an illustrative embodiment. Method 1700 provides additional details of step 1610 in FIG. 16. In FIG. 17, maintenance controller 406 processes the data logs 720 to determine whether to recommend replacement of one or more of the printheads 104. Maintenance controller 406 processes one or more scaled anomaly scores 716 for the printheads 104 (step 1702), such as over one or more time units 952 (e.g., five time units, ten time units, fifteen time units, etc.). For example, maintenance controller 406 may perform a comparison of the scaled anomaly scores 716 for each of the deployed printheads 104 over one or a plurality of time units 952 to a predetermined threshold value or multiple threshold values (optional step 1708). A scaled anomaly score 716 at or near a value of "0" may indicate a printhead 104 that is operating properly, while a scaled anomaly score 716 at or near a value of "1" may indicate a printhead 104 that is experiencing a failure condition. Maintenance controller 406 determines whether one or more printheads 104 are experiencing a failure condition based on the comparison of the scaled anomaly scores 716 (step 1704). When the determination is a printhead 104 is experiencing a failure condition, maintenance controller 406 provides a replacement recommendation for the printhead 104 (step 1706), including a printhead identifier 739. For example, maintenance controller 406 may store the replacement recommendation for the printhead 104 in the data log 720 (optional step 1710). In another example, maintenance controller 406 may transmit a message (e.g., to a client device) through the network interface component 402 indicating the replacement recommendation for the printhead 104 (optional step 1712). In another example, maintenance controller 406 may display the replacement recommendation for the printhead 104 via the user interface component 404 (optional step 1714). Maintenance controller 406 may provide the replacement recommendation for the printhead 104 in other ways. When the determination is the printhead 104 is not experiencing a failure condition, maintenance controller 406 may provide another recommendation (e.g., cleaning) or no recommendation for the printhead 104 (step 1709).

The result of method 1700 is a replacement recommendation is provided for each of the printheads 104. Due to the training of neural network 410 and recurrent neural network 412, maintenance controller 406 is able to identify, with reasonable accuracy, the printheads 104 that should be replaced and the printheads 104 that don't need to be replaced. As described above, some faults or inconsistencies of printheads 104 are recoverable via cleaning processes or the like, and printhead replacement is not needed. However, other faults or inconsistencies of printheads 104 are not recoverable (e.g., nozzle failure defect 746, such as delamination defect 752), and replacement of the printhead 104 is necessary. Printhead maintenance supervisor 400 provides a technical benefit in providing a replacement recommendation with reasonable accuracy so that printheads 104 are not inadvertently replaced earlier than needed, or failed printheads 104 are not left in service too long.

Figure 18:
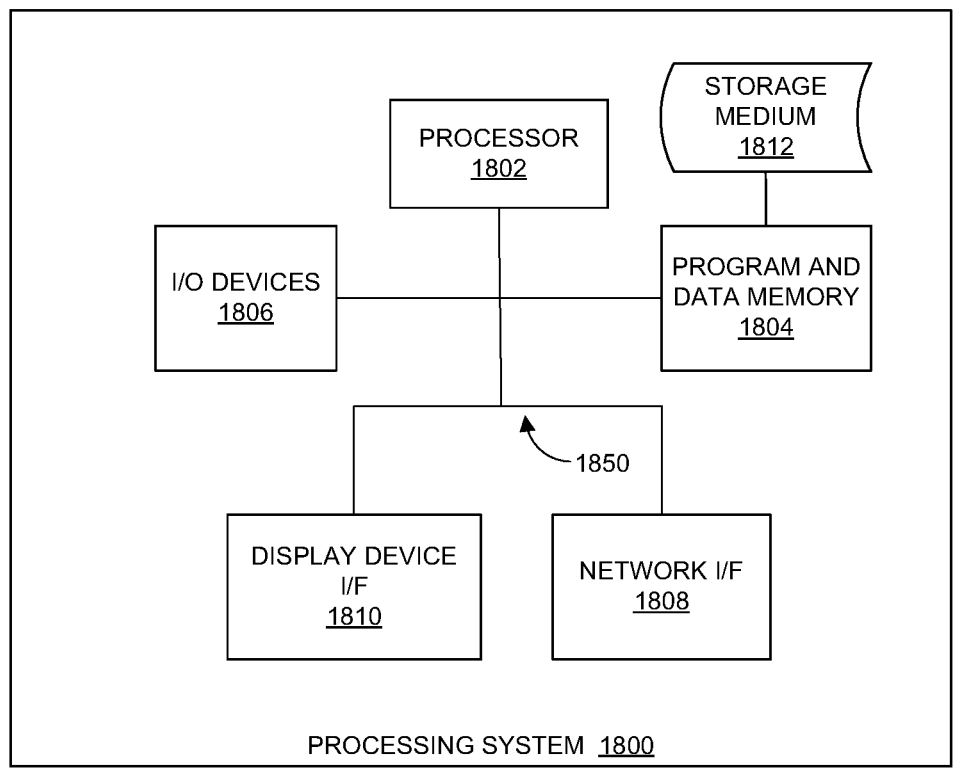
FIG. 18 illustrates a processing system operable to execute a computer readable medium embodying programmed instructions to perform desired functions in an illustrative embodiment.

Embodiments disclosed herein can take the form of software, hardware, firmware, or various combinations thereof. FIG. 18 illustrates a processing system 1800 operable to execute a computer readable medium embodying programmed instructions to perform desired functions in an illustrative embodiment. Processing system 1800 is operable to perform the above operations by executing programmed instructions tangibly embodied on computer readable storage medium 1812. In this regard, embodiments can take the form of a computer program accessible via computer-readable medium 1812 providing program code for use by a computer or any other instruction execution system. For the purposes of this description, computer readable storage medium 1812 can be anything that can contain or store the program for use by the computer.

Computer readable storage medium 1812 can be an electronic, magnetic, optical, electromagnetic, infrared, or semiconductor device. Examples of computer readable storage medium 1812 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1800, being suitable for storing and/or executing the program code, includes at least one processor 1802 coupled to program and data memory 1804 through a system bus 1850. Program and data memory 1804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1806 (including but not limited to keyboards, displays, pointing devices, etc.) can be coupled either directly or through intervening I/O controllers. Network adapter interfaces 1808 may also be integrated with the system to enable processing system 1800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1810 may be integrated with the system to interface to one or more display devices, such as printing systems and screens for presentation of data generated by processor 1802.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a printhead maintenance supervisor comprising at least one processor and memory. The at least one processor is configured to cause the printhead maintenance supervisor at least to train a first neural network to generate anomaly scores for printheads using an unsupervised learning algorithm based on first training samples of conforming printhead data from a pool of conforming printheads, and generate a training dataset for a recurrent second neural network by: identifying training printhead data for a pool of training printheads, inputting second training samples of the training printhead data into the first neural network to generate training anomaly scores for the training printheads over a first plurality of time units, and formatting third training samples for the training printheads, where each of the third training samples comprises a first time-series of training data objects over a number of consecutive time units for a training printhead, and a label for the training printhead, and where each of the training data objects includes a training anomaly score generated by the first neural network for the training printhead, and at least a subset of the training printhead data for the training printhead. The at least one processor is configured to further cause the printhead maintenance supervisor at least to train the recurrent second neural network to generate scaled anomaly scores for printheads using a supervised learning algorithm based on the training dataset.

Example 2 includes the subject matter of Example 1, where the label represents a printhead condition of a corresponding training printhead.

Example 3 includes the subject matter of Examples 1 and 2, where the subset of the training printhead data in the third training samples comprises a nozzle failure value indicating a number of failed nozzles.

Example 4 includes the subject matter of Examples 1-3, where the at least one processor is configured to further cause the printhead maintenance supervisor at least to identify deployed printhead data for a plurality of deployed printheads, operate the first neural network to generate deployment anomaly scores for the deployed printheads, operate the recurrent second neural network to scale the deployment anomaly scores generated by the first neural network to produce the scaled anomaly scores for the deployed printheads, and provide a replacement recommendation for one or more of the deployed printheads based on the scaled anomaly scores for the deployed printheads.

Example 5 includes the subject matter of Examples 1-4, where the at least one processor is configured to further cause the printhead maintenance supervisor at least to store the replacement recommendation in a data log corresponding with a deployed printhead.

Example 6 includes the subject matter of Examples 1-5, where the at least one processor is configured to further cause the printhead maintenance supervisor at least to transmit a message indicating the replacement recommendation via a network interface.

Example 7 includes the subject matter of Examples 1-6, where the at least one processor is configured to further cause the printhead maintenance supervisor at least to display the replacement recommendation via a user interface.

Example 8 includes the subject matter of Examples 1-7, where the at least one processor is configured to further cause the printhead maintenance supervisor at least to perform a comparison of one or more of the scaled anomaly scores for each of the deployed printheads to a threshold value, determine whether the one or more of the deployed printheads are experiencing a failure condition based on the comparison of the scaled anomaly scores, and provide the replacement recommendation for the one or more of the deployed printheads when the failure condition is determined.

Example 9 includes the subject matter of Examples 1-8, where to operate the first neural network, the at least one processor is configured to further cause the printhead maintenance supervisor at least to input first input samples of the deployed printhead data into the first neural network to generate the deployment anomaly scores for the deployed printheads over a second plurality of time units.

Example 10 includes the subject matter of Examples 1-9, where to operate the recurrent second neural network, the at least one processor is configured to further cause the printhead maintenance supervisor at least to format second input samples for the deployed printheads, where each of the second input samples comprises a second time-series of deployment data objects over the number of consecutive time units for a deployed printhead, and where each of the deployment data objects includes a deployment anomaly score generated by the first neural network for the deployed printhead, and at least a subset of the deployed printhead data for the deployed printhead. The at least one processor is configured to further cause the printhead maintenance supervisor at least to input the second input samples for the deployed printheads into the recurrent second neural network to output the scaled anomaly scores for the deployed printheads.

Example 11 includes the subject matter of Examples 1-10, where the first neural network comprises an autoencoder, and the recurrent second neural network comprises a Long Short-Term Memory (LSTM) neural network.

Example 12 includes the subject matter of Examples 1-11, where a cloud computing platform comprises the printhead maintenance supervisor of claim 1.

Some embodiments pertain to Example 13 that includes a method of recommending replacement of printheads. The method comprises training a first neural network to generate anomaly scores for printheads using an unsupervised learning algorithm based on first training samples of conforming printhead data from a pool of conforming printheads, and generating a training dataset for a recurrent second neural network by: identifying training printhead data for a pool of training printheads, inputting second training samples of the training printhead data into the first neural network to generate training anomaly scores for the training printheads over a first plurality of time units, and formatting third training samples for the training printheads, where each of the third training samples comprises a first time-series of training data objects over a number of consecutive time units for a training printhead, and a label for the training printhead, and where each of the training data objects includes a training anomaly score generated by the first neural network for the training printhead, and at least a subset of the training printhead data for the training printhead. The method further comprises training the recurrent second neural network to generate scaled anomaly scores for printheads using a supervised learning algorithm based on the training dataset.

Example 14 includes the subject matter of Example 13, where the label represents a printhead condition of a corresponding training printhead.

Example 15 includes the subject matter of Examples 13 and 14, where the subset of the training printhead data in the third training samples comprises a nozzle failure value indicating a number of failed nozzles.

Example 16 includes the subject matter of Examples 13-15, further comprising identifying deployed printhead data for a plurality of deployed printheads, operating the first neural network to generate deployment anomaly scores for the deployed printheads, operating the recurrent second neural network to scale the deployment anomaly scores generated by the first neural network to produce the scaled anomaly scores for the deployed printheads, and providing a replacement recommendation for one or more of the deployed printheads based on the scaled anomaly scores for the deployed printheads.

Example 17 includes the subject matter of Examples 13-16, further comprising performing a comparison of one or more of the scaled anomaly scores for each of the deployed printheads to a threshold value, and determining whether the one or more of the deployed printheads are experiencing a failure condition based on the comparison of the scaled anomaly scores, where providing the replacement recommendation comprises providing the replacement recommendation for the one or more of the deployed printheads when the failure condition is determined.

Example 18 includes the subject matter of Examples 13-17, where operating the first neural network comprises inputting first input samples of the deployed printhead data into the first neural network to generate the deployment anomaly scores for the deployed printheads over a second plurality of time units.

Example 19 includes the subject matter of Examples 13-18, where operating the recurrent second neural network comprises formatting second input samples for the deployed printheads, where each of the second input samples comprises a second time-series of deployment data objects over the number of consecutive time units for a deployed printhead, and where each of the deployment data objects includes a deployment anomaly score generated by the first neural network for the deployed printhead, and at least a subset of the deployed printhead data for the deployed printhead, and inputting the second input samples for the deployed printheads into the recurrent second neural network to output the scaled anomaly scores for the deployed printheads.

Some embodiments pertain to Example 20 that includes a non-transitory computer readable medium embodying programmed instructions executed by a processor, where the instructions direct the processor to implement a method of recommending replacement of printheads. The method comprises training a first neural network to generate anomaly scores for printheads using an unsupervised learning algorithm based on first training samples of conforming printhead data from a pool of conforming printheads, and generating a training dataset for a recurrent second neural network by: identifying training printhead data for a pool of training printheads, inputting second training samples of the training printhead data into the first neural network to generate training anomaly scores for the training printheads over a first plurality of time units, and formatting third training samples for the training printheads, where each of the third training samples comprises a first time-series of training data objects over a number of consecutive time units for a training printhead, and a label for the training printhead, and where each of the training data objects includes a training anomaly score generated by the first neural network for the training printhead, and at least a subset of the training printhead data for the training printhead. The method further comprises training the recurrent second neural network to generate scaled anomaly scores for printheads using a supervised learning algorithm based on the training dataset.

Although specific embodiments were described herein, the scope of the invention is not limited to those specific embodiments. The scope of the invention is defined by the following claims and any equivalents thereof.

What is claimed is:

1. A printhead maintenance supervisor, comprising:
at least one processor and memory;
the at least one processor is configured to cause the printhead maintenance supervisor at least to:
train a first neural network to generate anomaly scores for printheads using an unsupervised learning algorithm based on first training samples of conforming printhead data from a pool of conforming printheads;
generate a training dataset for a recurrent second neural network by:
identifying training printhead data for a pool of training printheads;
inputting second training samples of the training printhead data into the first neural network to generate training anomaly scores for the training printheads over a first plurality of time units; and
formatting third training samples for the training printheads, wherein each of the third training samples comprises a first time-series of training data objects over a number of consecutive time units for a training printhead, and a label for the training printhead, and wherein each of the training data objects includes a training anomaly score generated by the first neural network for the training printhead, and at least a subset of the training printhead data for the training printhead; and
train the recurrent second neural network to generate scaled anomaly scores for printheads using a supervised learning algorithm based on the training dataset.

2. The printhead maintenance supervisor of claim 1, wherein:
the label represents a printhead condition of a corresponding training printhead.

3. The printhead maintenance supervisor of claim 1, wherein:
the subset of the training printhead data in the third training samples comprises a nozzle failure value indicating a number of failed nozzles.

4. The printhead maintenance supervisor of claim 1, wherein the at least one processor is configured to further cause the printhead maintenance supervisor at least to:
identify deployed printhead data for a plurality of deployed printheads;
operate the first neural network to generate deployment anomaly scores for the deployed printheads;
operate the recurrent second neural network to scale the deployment anomaly scores generated by the first neural network to produce the scaled anomaly scores for the deployed printheads; and
provide a replacement recommendation for one or more of the deployed printheads based on the scaled anomaly scores for the deployed printheads.

5. The printhead maintenance supervisor of claim 4, wherein the at least one processor is configured to further cause the printhead maintenance supervisor at least to:
store the replacement recommendation in a data log corresponding with a deployed printhead.

6. The printhead maintenance supervisor of claim 4, wherein the at least one processor is configured to further cause the printhead maintenance supervisor at least to:
transmit a message indicating the replacement recommendation via a network interface.

7. The printhead maintenance supervisor of claim 4, wherein the at least one processor is configured to further cause the printhead maintenance supervisor at least to:
display the replacement recommendation via a user interface.

8. The printhead maintenance supervisor of claim 4, wherein the at least one processor is configured to further cause the printhead maintenance supervisor at least to:
perform a comparison of one or more of the scaled anomaly scores for each of the deployed printheads to a threshold value;
determine whether the one or more of the deployed printheads are experiencing a failure condition based on the comparison of the scaled anomaly scores; and provide the replacement recommendation for the one or more of the deployed printheads when the failure condition is determined.

9. The printhead maintenance supervisor of claim 4, wherein to operate the first neural network, the at least one processor is configured to further cause the printhead maintenance supervisor at least to:
input first input samples of the deployed printhead data into the first neural network to generate the deployment anomaly scores for the deployed printheads over a second plurality of time units.

10. The printhead maintenance supervisor of claim 9, wherein to operate the recurrent second neural network, the at least one processor is configured to further cause the printhead maintenance supervisor at least to:
format second input samples for the deployed printheads, wherein each of the second input samples comprises a second time-series of deployment data objects over the number of consecutive time units for a deployed printhead, and wherein each of the deployment data objects includes a deployment anomaly score generated by the first neural network for the deployed printhead, and at least a subset of the deployed printhead data for the deployed printhead; and
input the second input samples for the deployed printheads into the recurrent second neural network to output the scaled anomaly scores for the deployed printheads.

11. The printhead maintenance supervisor of claim 1, wherein:
the first neural network comprises an autoencoder; and
the recurrent second neural network comprises a Long Short-Term Memory (LSTM) neural network.

12. A cloud computing platform comprising the printhead maintenance supervisor of claim 1.

13. A method of recommending replacement of printheads, the method comprising:
training a first neural network to generate anomaly scores for printheads using an unsupervised learning algorithm based on first training samples of conforming printhead data from a pool of conforming printheads;
generating a training dataset for a recurrent second neural network by:
identifying training printhead data for a pool of training printheads;
inputting second training samples of the training printhead data into the first neural network to generate training anomaly scores for the training printheads over a first plurality of time units; and
formatting third training samples for the training printheads, wherein each of the third training samples comprises a first time-series of training data objects over a number of consecutive time units for a training printhead, and a label for the training printhead, and wherein each of the training data objects includes a training anomaly score generated by the first neural network for the training printhead, and at least a subset of the training printhead data for the training printhead; and
training the recurrent second neural network to generate scaled anomaly scores for printheads using a supervised learning algorithm based on the training dataset.

14. The method of claim 13, wherein:
the label represents a printhead condition of a corresponding training printhead.

15. The method of claim 13, wherein:
the subset of the training printhead data in the third training samples comprises a nozzle failure value indicating a number of failed nozzles.

16. The method of claim 13, further comprising:
identifying deployed printhead data for a plurality of deployed printheads;
operating the first neural network to generate deployment anomaly scores for the deployed printheads;
operating the recurrent second neural network to scale the deployment anomaly scores generated by the first neural network to produce the scaled anomaly scores for the deployed printheads; and
providing a replacement recommendation for one or more of the deployed printheads based on the scaled anomaly scores for the deployed printheads.

17. The method of claim 16, further comprising:
performing a comparison of one or more of the scaled anomaly scores for each of the deployed printheads to a threshold value; and
determining whether the one or more of the deployed printheads are experiencing a failure condition based on the comparison of the scaled anomaly scores;
wherein providing the replacement recommendation comprises providing the replacement recommendation for the one or more of the deployed printheads when the failure condition is determined.

18. The method of claim 16, wherein operating the first neural network comprises:
inputting first input samples of the deployed printhead data into the first neural network to generate the deployment anomaly scores for the deployed printheads over a second plurality of time units.

19. The method of claim 18, wherein operating the recurrent second neural network comprises:
formatting second input samples for the deployed printheads, wherein each of the second input samples comprises a second time-series of deployment data objects over the number of consecutive time units for a deployed printhead, and wherein each of the deployment data objects includes a deployment anomaly score generated by the first neural network for the deployed printhead, and at least a subset of the deployed printhead data for the deployed printhead; and
inputting the second input samples for the deployed printheads into the recurrent second neural network to output the scaled anomaly scores for the deployed printheads.

20. A non-transitory computer readable medium embodying programmed instructions executed by a processor, wherein the instructions direct the processor to implement a method of recommending replacement of printheads, the method comprising:
training a first neural network to generate anomaly scores for printheads using an unsupervised learning algorithm based on first training samples of conforming printhead data from a pool of conforming printheads;
generating a training dataset for a recurrent second neural network by:
identifying training printhead data for a pool of training printheads;
inputting second training samples of the training printhead data into the first neural network to generate training anomaly scores for the training printheads over a first plurality of time units; and
formatting third training samples for the training printheads, wherein each of the third training samples comprises a first time-series of training data objects over a number of consecutive time units for a training printhead, and a label for the training printhead, and wherein each of the training data objects includes a training anomaly score generated by the first neural network for the training printhead, and at least a subset of the training printhead data for the training printhead; and training the recurrent second neural network to generate scaled anomaly scores for printheads using a supervised learning algorithm based on the training dataset.

\* \* \* \* \*